(12) United States Patent
Itoh

(10) Patent No.: US 6,204,972 B1
(45) Date of Patent: Mar. 20, 2001

(54) ILLUMINATION OPTICAL SYSTEM AND PROJECTION-TYPE DISPLAY APPARATUS

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/506,256

(22) Filed: Feb. 17, 2000

Related U.S. Application Data

(63) Continuation of application No. 09/049,935, filed on Mar. 30, 1998.

(30) Foreign Application Priority Data

Mar. 28, 1997 (JP) ...................................................... 9-95015

(51) Int. Cl.[7] .................................................. G02B 27/10
(52) U.S. Cl. .......................... 359/622; 359/618; 359/621
(58) Field of Search .................................. 359/618, 619, 359/621, 622, 623, 626, 634, 583

(56) References Cited

U.S. PATENT DOCUMENTS

| | | | |
|---|---|---|---|
| 5,083,854 | * 1/1992 | Zampolin et al. ...................... | 359/40 |
| 5,098,184 | 3/1992 | Van Den Brandt et al. ......... | 353/102 |
| 5,726,800 | * 3/1998 | Ezra et al. ............................ | 359/466 |
| 5,786,939 | 7/1998 | Watanabe .............................. | 359/621 |
| 5,796,522 | 8/1998 | Meyers ................................. | 359/622 |
| 6,046,856 | * 4/2000 | Takahashi et al. .................... | 359/621 |

FOREIGN PATENT DOCUMENTS

| | | |
|---|---|---|
| 1-302385 | 12/1989 | (JP) . |
| 9-146065 | * 6/1997 | (JP) . |
| WO 94/22042 | 9/1994 | (WO) . |

* cited by examiner

*Primary Examiner*—Ricky Mack
(74) *Attorney, Agent, or Firm*—Oliff & Berridge, PLC

(57) ABSTRACT

An upper portion and lower portion of a first lens array may be relatively offset from each other in an x direction. A second lens array is also offset correspondingly to the first lens array. Since an angle at which a partial light beam transmitted through the upper portions of the first and second lens arrays illuminates an area of illumination is different from an angle at which a partial light beam transmitted through the lower portions of the first and second lens arrays illuminates the area of illumination, dark lines generated by these partial light beams appear in different positions on a screen. With this arrangement, the dark lines resulting from the center line of a cross-dichroic prism are made less visible.

4 Claims, 17 Drawing Sheets

LIGHT BEAM PASSING THROUGH A MICROLENS AT THIRD ROW FROM TOP

LIGHT BEAM PASSING THROUGH A MICROLENS AT THIRD ROW FROM TOP

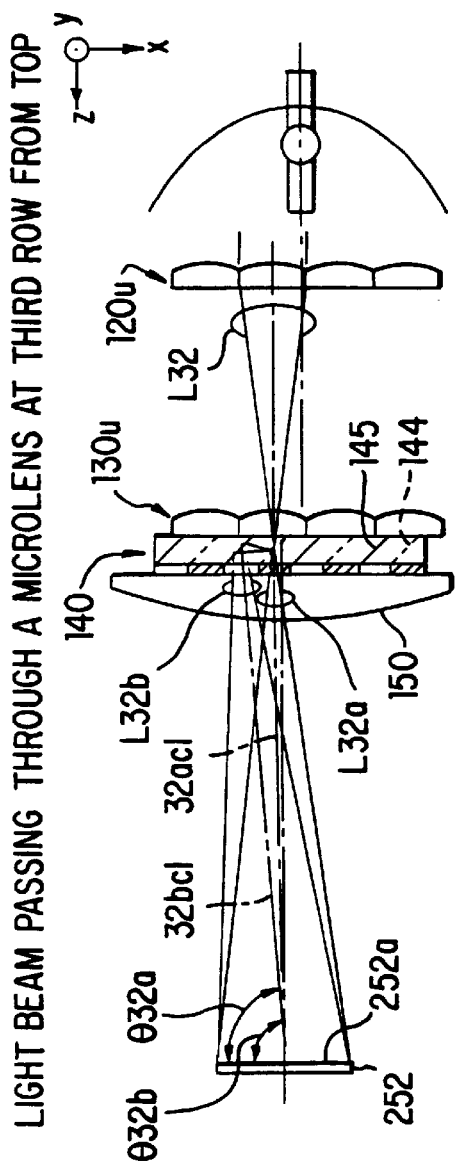
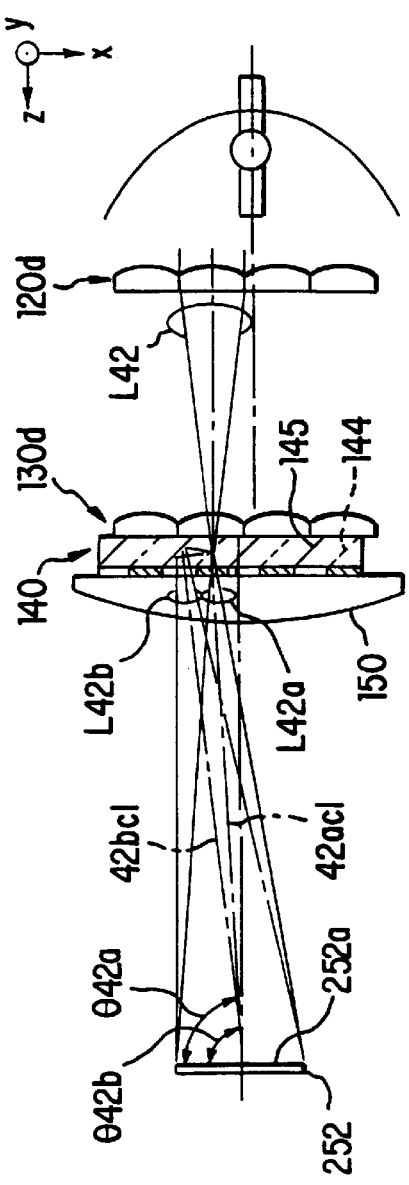

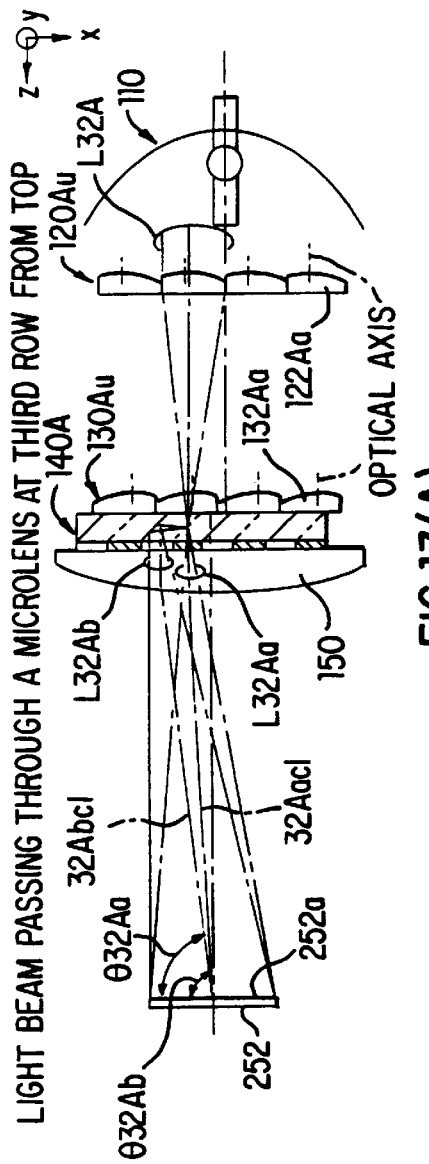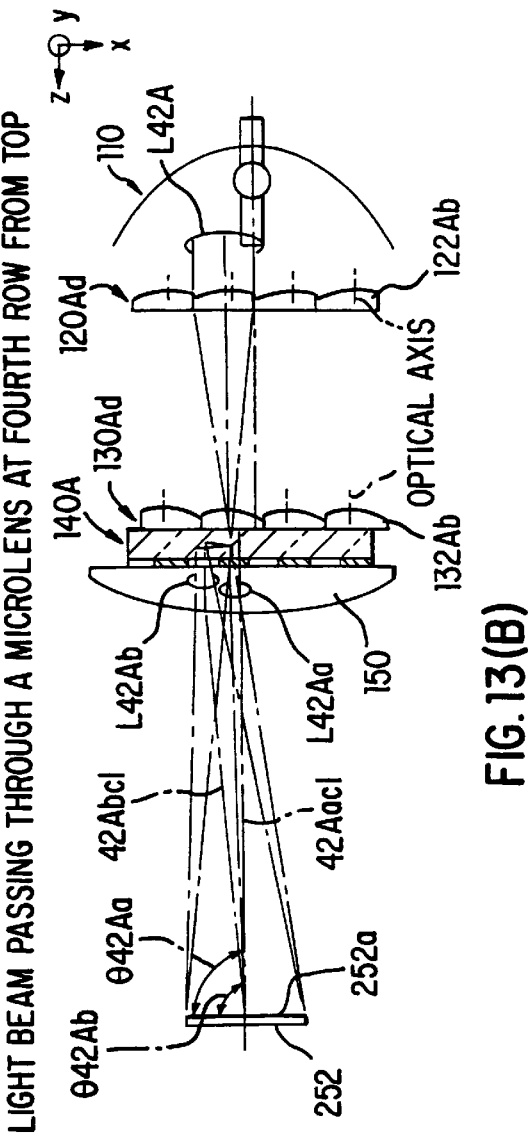

PROJECTION-TYPE DISPLAY APPARATUS

CROSS-DICHROIC PRISM 48

ILLUMINATION OPTICAL SYSTEM AND PROJECTION-TYPE DISPLAY APPARATUS

This is a Continuation of application Ser. No. 09/049,935 filed Mar. 30, 1998. The entire disclosure of the prior application is hereby incorporated by reference herein in its entirety.

BACKGROUND OF THE INVENTION

1. Field of Invention

The present invention relates to a projection-type display apparatus with a color light synthesizing device and an illumination optical system for the apparatus.

2. Description of Related Art

Projection-type display apparatuses for projecting a color image onto a projection screen employ a cross-dichroic prism in many cases. In a transmission-type liquid-crystal projector, a cross-dichroic prism is used as color synthesizing means for synthesizing three color light beams of red, green and blue and for outputting the synthesized light beam in the same direction. In a reflection-type liquid-crystal projector, a cross-dichroic prism is used as color separation means for separating a white light beam into three light beams of red, green and blue while being used as color synthesizing means at the same time for synthesizing back modulated three color light beams and outputting the synthesized light beam in the same direction. One of known projection-type display apparatuses using a cross-dichroic prism is disclosed in Japanese Unexamined Patent Publication 1-302385, for example.

FIG. 16 shows a concept of the major portion of a projection-type display apparatus. The projection-type display apparatus includes three liquid-crystal light valves 42, 44 and 46, a cross-dichroic prism 48 and a projection lens system 50. The cross-dichroic prism 48 synthesizes three color light beams of red, green and blue respectively modulated by the three light valves 42, 44 and 46 and outputs the synthesized light beam to the projection lens system 50. The projection lens system 50 projects the synthesized light beam onto a projection screen 52.

FIG. 17 is a partly exploded perspective view showing the cross-dichroic prism 48. The cross-dichroic prism 48 is manufactured by gluing four right-angle prisms with right-angle surfaces interfaced by an optical cement.

FIGS. 18(A) and 18(B) are explanatory views illustrating the problem that arises when the cross-dichroic prism 48 is used. As shown in FIG. 18(A), the cross-dichroic prism 48 has a red-color light reflecting film 60R and a blue-color light reflecting film 60B, both of which are arranged in the shape of the letter X at the interfaces formed in the right-angle surfaces of the four right-angle prisms. Since an optical cement layer 62 is formed in the gaps between four right-angle prisms, both the reflecting films 60R and 60B have a gap at the central axis 48a of the cross-dichroic prism 48.

When a light beam passing through the central axis 48a of the cross-dichroic prism 48 is projected onto the projection screen 52, a dark line resulting from the central axis 48a is displayed in a presented image. FIG. 18(B) shows one example of such a dark line DL. The dark line DL, of a color different from the rest of the image, presents a slightly darker band at the center of the projected image. It is considered that the dark line DL is attributed to light scattering taking place in the gap in the central axis 48a and failure in the reflection of red-color light and blue-color light. This problem is also encountered in a cross-dichroic mirror in which two types of dichroic mirrors having selectively reflecting films, such as a red-color light reflecting film and a blue-color light reflecting film, are crossed in the letter X configuration. In this case, a dark line attributed to a central axis of the mirrors is also formed in a resulting image.

As described above, the dark line is created at the center of the screen by the central axis of the cross-dichroic prism 48 or the cross-dichroic mirror in the conventional projection-type display apparatus.

SUMMARY OF THE INVENTION

This invention has been developed with a view to resolving the above problem, and it is an object of the present invention to provide a technique that makes less pronounced a dark line attributed to a central axis of optical means having dichroic films of two types arranged in the letter X configuration, such as a cross-dichroic prism and a cross-dichroic mirror.

Referring to FIGS. 1 through 4, the principle for solving the problem is specifically discussed. Throughout the drawings, a z direction is aligned with the direction of travel of the light beam, an x direction is at 3 o'clock position about the direction of travel of the light beam (z axis), and a y direction is at 12 o'clock position. See FIG. 2. For convenience of the following discussion, the x direction represents the direction of rows and the y direction represents the direction of columns. Although the discussion of the principle is based on a specific example for simplicity, the present invention is not limited to such a specific example.

In the field of projection-type display apparatus, illumination optical systems (also referred to as an integrator optical system) having two lens arrays, each having a plurality of small lenses, as described in WO94/22042, are known as a technique for reducing nonuniform illuminance of an illuminating light by splitting a light beam into a plurality of partial light beams.

FIGS. 1(A), 1(B), 1(C) and 1(D) illustrates the principle of dark line generation in the projection-type display apparatus using a cross-dichroic prism which employs an integrator optical system. FIGS. 1(A) and 1(C) show light beams (represented by full lines) that are transmitted through small lenses 10 which are arranged in mutually different positions in the x direction, namely, small lenses 10 which are arranged in different positions in the direction of columns, and also show the trajectories (represented by thin broken lines) of central optical axes of the light beams. FIGS. 1(B) and 1(D) also show the positions of dark lines DLa and DLb on a screen 7.

The light beam emitted by a light source (not shown) is split into a plurality of partial beams through a first lens array 1 and a second lens array 2, each having a plurality of small lenses 10. The light beams transmitted through the small lenses 10 in the first and second lens arrays 1 and 2 are converted into parallel light beams in parallel with the central axis of a collimator lens 15. Partial light beams transmitted through the collimator lens 15 are superimposed on a liquid-crystal light valve 3 to illuminate uniformly a predetermined area. Although FIG. 1 shows a single liquid-crystal light valve 3 only, the same principle of the integrator optical system and generation of dark line are true of the other two liquid-crystal light valves in a system such as illustrated in FIG. 18(A).

FIG. 2 is a perspective view showing the external appearance of the first and second lens arrays 1, 2. Each of the first and second lens arrays 1 and 2 is constructed of a matrix of M rows and N columns of small lenses 10, each having a rectangular shape. In this example, M=10 and N=8, and FIG. 1(A) shows the trajectory of a partial light beam transmitted through a small lens 10 in the second column and FIG. 1(C) shows the trajectory of a partial light beam transmitted through a small lens 10 in the seventh column.

Light beams superimposed on the liquid-crystal light valve 3 are modulated according to image information, and then directed to the cross-dichroic prism 4. The light beam output from the cross-dichroic prism 4 is projected onto the screen 7 through a projection lens system 6.

A light beam passing through the portion of the central axis 5 (along the y direction) is also projected at the positions of Pa and Pb on the screen 7 as represented by heavy broken lines in FIGS. 1(A) and 1(C). As already described in connection with the conventional art, light scattering takes place or a light, which would be otherwise reflected, is not reflected, in the gap between the reflecting films in the vicinity of the central axis 5, and the quantity of light passing through in and around the central axis 5 is reduced. Referring to FIGS. 1(B) and 1(D), an area suffering luminance lower than that of the surrounding area, namely the dark lines DLa and DLb are created.

The relationship between the dark line and the first and second lens arrays 1 and 2 is now discussed. As may be seen in FIG. 3(A), which is an enlarged fragmentary view of FIG. 1(A), an image formed through the liquid-crystal light valve 3 is inverted, enlarged and projected onto the projection screen 7 through the projection lens system 6. FIG. 3(B) is a cross-sectional view of the cross-dichroic prism 4 taken along the xy plane in which the central axis 5 lies in. Referring to FIGS. 3(A) and 3(B), r1 represents the distance from one edge 11 of the cross section 8 of a partial light beam to the central axis 5 and r2 represents the distance from the other edge 12 of the cross section 8 of the partial light beam to the central axis 5, when the partial light beam is sectioned along the xy plane including the central axis 5 of the cross-dichroic prism 4. Since the image of the cross section 8 of the partial light beam is inverted, enlarged and projected through the projection lens system 6, the ratio of the distance R2 from one edge 13 of a projection area 9 to the dark line DLa to the distance R1 from the other edge of the projection area 9 to the dark line DLa on the projection screen 7 is equal to the ratio of the distance r2 to the distance r1. Namely, the position of the dark line DLa depends on where the cross section 8 of the partial light beam in the xy plane including the central axis 5 of the cross-dichroic prism 4 is present relative to the central axis 5.

As understood from the comparison between FIG. 1(A) and FIG. 1(C), the position of the cross section of the partial light beam along the xy plane including the central axis 5 of the cross-dichroic prism 4 becomes different from FIG. 1(A) to FIG. 1(C). The dark lines DLa and DLb are therefore created at different positions. Similarly, in connection with the partial light beams transmitted through small lenses 10 in columns other than second and seventh columns in the first and second lens arrays 1 and 2, the position of the cross section of the light beam along the xy planes including the central axis 5 of the cross-dichroic prism 4 is different from column to column, and the number of the dark lines is equal to the number of columns of the first and second lens arrays 1 and 2, namely, N dark lines are created.

The partial light beams, transmitted through the M small lenses 10 arranged in the same columns in the first and second lens arrays 1 and 2, create dark lines DLc at substantially the same position on the projection screen 7 as shown in FIG. 4. Each of the N dark lines is created by the superimposed partial light beams that are transmitted through the M small lenses 10 arranged in the same and corresponding columns in the first and second lens array 1 and 2, and darkness of the dark lines is equal to the sum of darkness of all dark lines created by each of M small lenses 10.

Summarizing the above discussion leads to the following principles.

Firstly, when the position of the central axis of the partial light beam relative to the central axis 5 of the cross-dichroic prism 4 differs, the position of the dark line created also differs. The light beams that are transmitted through different small lenses which positions in the direction of rows are different are mutually different in position relative to the position of the central axis 5 of the cross-dichroic prism 4, and create dark lines in different positions.

Secondly, the reason why the position of the cross section of the partial light beam along the xy plane including the central axis 5 of the cross-dichroic prism 4 is different is that the angle of incidence of the partial light beam to the cross-dichroic prism 4 is different (see FIGS. 1(A)–1(D)). Since the light beams that are transmitted through different columns from the first lens array to the second lens array enter the cross-dichroic prism 4 at different angles, the positions of the partial light beams relative to the central axis 5 are different.

When the angles of incidence of the partial light beams to the cross-dichroic prism 4 are different or when the angles of the partial light beams superimposed on the liquid-crystal light valve 3 are different, the positions of the dark lines created are also different.

As already described, since the partial light beams that are transmitted through the M small lenses arranged in the same columns create dark lines at substantially the same position on the projection screen 7, the overall darkness is substantially equal to the sum of darkness of all M small lenses 10. It is therefore preferred that the dark lines formed through the M small lenses 10 be created at different positions on the projection screen 7. With such an arrangement, darkness per dark line is lowered while the number of dark lines increases, and the dark lines are thus made less noticeable as a result. It is not required, however, that all dark lines from the M small lenses 10 are created in different positions, and it will be sufficient enough if some of dark lines are created in different positions.

Creating dark lines in different positions is made possible by using the first or second principle described above.

According to the first principle, some of partial light beams transmitted through the M small lenses 10 arranged in the same column are changed in the positions of their central axes with respect to the central axis 5 of the cross-dichroic prism 4 relative to the remaining partial light beams.

According to the second principle, some of partial light beams that are transmitted through the M small lenses 10 arranged in the same column are changed in angle to the liquid-crystal light valve 3 or in angle to the cross-dichroic prism 4 relative to the remaining partial light beams.

The present invention successfully resolved the above-described problem encountered in the conventional art by taking advantage of the above principles. The means, operation and advantages of the present invention are now discussed.

According to a first aspect of the invention, an illumination optical system for emitting an illuminating light beam includes a light source emitting a light beam, a first lens array including a plurality of first small lenses arranged in rows that split the light beam emitted by the light source into a plurality of partial light beams, and a second lens array including a plurality of second small lenses arranged in rows respectively corresponding to the plurality of first small lenses in the first lens array, wherein each of the first and second lens arrays is divided into a plurality of groups of rows, each of the groups includes at least two rows of small lenses and is offset from adjoining groups of rows. The first and second groups of rows are offset in a direction of the rows.

A projection-type display apparatus that implements the first invention comprises color light separation device for separating an illuminating light into three color light beams, three light modulation devices for respectively performing light modulation to the three color light beams based on a given image signal, a color synthesizing device having dichroic films of two types mutually crossed as in the letter X and having a central axis corresponding to a position where the dichroic films intersect each other, for synthesizing three color light beams modulated by the three light modulation means to output the resulting light beam in a same direction, and a projection device for projecting the resulting light beam synthesized by the color synthesizing device to a projection surface. The "direction of rows" means a direction perpendicular to the direction of the central axis of the color synthesizing device. The direction of columns is therefore in parallel with the central axis. Each of three light modulation devices corresponds to an area of illumination. In the above projection-type display apparatus, out of the plurality of partial light beams split through the first and second lens arrays, at least one column of partial light beams of the plurality of partial light beams arranged in the direction of columns are transmitted at an approximately identical predetermined angle through the area of illumination, and project to the central axis of the color synthesizing device at substantially the same position on the screen to form a dark line.

In the first aspect of the invention, one of the groups is arranged to be offset from another group in the direction of rows in the first and second lens arrays, and partial light beams transmitted through the one area, are transmitted through the area of illumination, at a angle different from that at which the partial light beams transmitted through the other area are transmitted, and are transmitted through the cross-dichroic prism at a different position. According to the first principle, the central axis of the color synthesizing device is prevented from being projected at the same position by the partial light beams arranged generally in alignment in the direction of columns. As a result, the dark line created in the image projected is made less visible.

According to a second aspect of the invention, an illumination optical system for emitting an illuminating light beam includes a light source emitting a light beam, a first lens array including a matrix of a plurality of first small lenses that split the light beam emitted by the light source into a plurality of partial light beams, and a second lens array including a plurality of second small lenses respectively corresponding to the plurality of small lenses in the first lens array, wherein the plurality of first small lens, in at least one of the rows are decentered lenses, each having an optical center offset from a geometric center of the lenses in the direction of the rows so that the first small lenses deflect the partial light beam transmitted therethrough to an optical path different from an optical path of the partial light beams transmitted through the plurality of first small lenses in the remaining rows, and wherein the plurality of second small lenses include optical means in each of the rows, the optical means in at least one being offset by a predetermined displacement from the optical means in the remaining rows in a direction of rows.

The optical means is preferably decentered lenses that have an optical center that is offset in the direction opposite to the direction in which the optical center of the first small lenses is offset from the geometric center of the first small lenses.

When the second aspect of the invention is implemented in the projection-type display apparatus that is described in connection with the first aspect of the invention, partial light beams, transmitted through the plurality of first and second small lenses, are transmitted through the area of illumination at an angle different from that at which partial light beams transmitted through the remaining rows of small lenses are transmitted through the area of illumination, and are transmitted through the cross-dichroic prism at a different position. According to the first principle, the central axis of the color synthesizing device is prevented from being projected at the same position by the partial light beams arranged in the direction of columns. As a result, the dark line created in the image projected is made less visible.

In the second aspect of the invention, it is preferable that at least one row of small lenses in the second lens array transmit partial light beams having a relatively large light quantity are positioned to be offset from the remaining rows of small lenses in the second lens array in the direction of rows.

Because darkness of the dark line formed by the partial light beam having a relatively large light quantity is relatively large, the dark line created in the projected image is more pronounced if the angles at which partial light beams are transmitted through the area of illumination are equal. Since the angles at which the partial light beams having a relatively large light quantity are transmitted through the area of illumination are mutually different, the dark line created in the projected image is made less pronounced.

In the second aspect of the invention, in the second plurality of small lenses, it is preferable that the small lenses in odd-numbered rows and the small lenses in even-numbered rows are mutually and alternately offset in the direction of the rows.

With this arrangement, in one column of partial light beams arranged generally in the direction of columns, the angle at which the partial light beams transmitted through the odd rows of the first and second lens arrays are transmitted through the area of illumination is different from the angle at which the partial light beams transmitted through the even rows are transmitted through the area of illumination, and the central axis of the color synthesizing device is prevented from being projected at the same position by the partial light beams arranged generally in alignment in the direction of columns. As a result, the dark line created in the image projected is made less visible.

In the second aspect of the invention, the second lens array is preferably divided into a plurality of areas by at least one division line and at least one of the plurality of areas is positioned to be offset from the remaining areas in the direction of rows.

With this arrangement, in one column of partial light beams arranged generally in the direction of columns, the angle at which the partial light beams transmitted through the one area of the second lens array are transmitted through the area of illumination is different from the angle at which the partial light beams transmitted through another area are transmitted through the area of illumination, and the central axis of the color synthesizing device is prevented from being projected at the same position by the partial light beams arranged in the direction of columns. As a result, the dark line created in the image projected is made less visible.

Preferably, in the second aspect of the invention, the plurality of second small lenses in the second lens array are divided into a plurality of groups of rows, the small lenses of each group of rows are positioned to be in alignment in the direction of rows, and the small lenses of different groups of rows are positioned to be mutually offset from each other in the direction of rows.

With this arrangement as well, in one column of partial light beams arranged generally in the direction of columns, the angles at which the partial light beams transmitted through small lenses in different groups are transmitted through the area of illumination are different, and the central axis of the color synthesizing device is prevented from being projected at the same position by the partial light beams arranged in the direction of columns. As a result, the dark line created in the image projected is made less visible.

In this case, the dividing of the small lenses into the plurality of groups is performed such that the sums of quantity of light of partial light beams that are respectively transmitted through the respective groups are substantially equal.

If the sum of light quantities of partial light beams transmitted through one group is different from the sum of light quantity of partial light beams transmitted through another group, the dark lines corresponding to the central axis of the color synthesizing device formed by the partial light beams transmitted through the respective groups are also different in darkness level. Although the object of the present invention is to make the dark line less visible, a difference in darkness of the dark lines is not preferable from the standpoint of making the dark line less visible, because light discrimination capability through comparison of relative strength is high. If the sums of light quantities of the partial light beams in the respective groups are equal to each other, the dark lines of the partial light beams in the respective groups are equalized in darkness level.

In the first and second aspects of the invention, the predetermined displacement of the groups of small lenses is about ½ to ⅔ of the width of one of the small lens in the direction of rows.

With this arrangement, a dark line is created, by light beams transmitted through small lenses at one row, at an intermediate position between dark lines formed by partial light beams transmitted through small lenses at another row that is displaced from the first row.

In each of the first and second aspects of the invention, the illumination optical system may comprise an superimposing lens disposed at an exit side of the second lens array, for substantially superimposing the plurality of partial light beams transmitted through the plurality of small lenses of the first lens array and the second lens array at a position of illumination of a light modulation device, a polarization conversion device arranged between the second lens array and the superimposing lens, the polarization conversion device comprising a polarizing beam splitter including a plurality of sets of mutually parallel polarization splitting films and reflecting films and splitting each of a plurality of partial light beams transmitted through the plurality of second small lenses of the second lens array into linearly polarized light components of two types, and a polarization conversion element for aligning the polarization directions of the linearly polarized light components of the two types split by the polarizing beam splitter array. In the illumination optical system of the first aspect of the invention, the polarization converting device is divided into a plurality of areas corresponding to the arrangement of the groups of small lenses of the first and second lens arrays. In the illumination optical system of the second aspect of the invention, the polarization converting device is divided into a plurality of areas corresponding to the arrangement of the optical means of the second lens array.

With this arrangement, utilization of light is enhanced, because the randomly polarized illuminating light beam is converted into one type of linearly polarized light beam before use.

When the polarization conversion device is provided, it is preferable that the first group of rows of small lenses is offset from the second group of rows of small lenses by a displacement of about ¼ to ⅓ of the width of one of the small lens in the direction of rows.

The light beam output from the second lens array is converted into a linearly polarized light beam exiting from the polarization separating film of the polarization conversion device and a linearly polarized light beam, offset in the direction of rows, exits from the reflecting film. Namely, with the polarization conversion device provided, an interval between partial light beams in the direction of rows is half the interval without the polarization conversion device. With the above arrangement, therefore, a dark line is created, by light beams transmitted through small lenses at one row, at an intermediate position between dark lines formed by partial light beams transmitted through small lenses at another row that is displaced from the one row.

According to a third aspect of the invention, a projection-type image display apparatus comprises: an illumination optical system according to the first aspect of the invention or the second aspect of the invention, a color light separation device for separating an illuminating light into three color light beams, three light modulation devices each having a light entrance surface as an area of illumination that light modulate the three color light beams based on a given image signal, a color synthesizing device having dichroic films of two types mutually crossed in the shape of a letter X and having central axes corresponding to positions where the dichroic films intersect each other and arranged in a direction of columns of the small lenses, the color synthesizing device synthesizing the three color light beams modulated by the three light modulation devices to output the resulting light beams in a same direction, and a projection device for projecting the resulting light beam synthesized by the color synthesizing device to a projection surface.

By using the illumination optical system according to the first aspect of the invention or the second aspect of the invention in the projection-type display apparatus, the dark line created in the projected image is made less visible in the same manner as in the first and second aspects of the invention.

BRIEF DESCRIPTION OF THE DRAWINGS

FIGS. 3(A) and 3((B) are an enlarged view of FIG. 1(A) and a cross-sectional view taken along the xy plane which the central axis 5 of the cross-dichroic prism 4 lies in.

FIGS. 9(A) and 9(B) are explanatory views showing the functions of the first and second lens arrays 120 and 130, and polarization conversion device 140 according to the first embodiment.

FIGS. 13(A) and 13(B) are explanatory views showing the functions of the first and second lens array 120A and 130A and polarization conversion device 140A according to the second embodiment.

DETAILED DESCRIPTION OF PREFERRED EMBODIMENTS

Figure 1A:
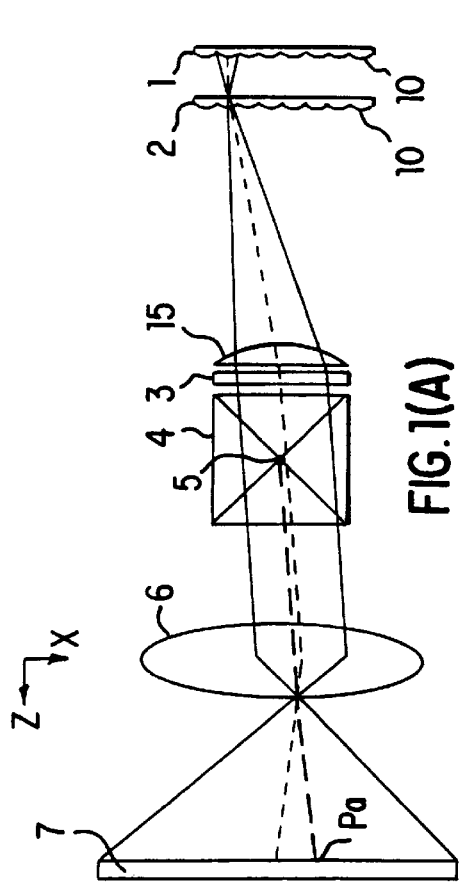
FIGS. 1(A)–1(D) are views illustrating the principle of dark line generation in the projection-type display apparatus using a cross-dichroic prism which employs an integrator optical system.
Figure 1B:
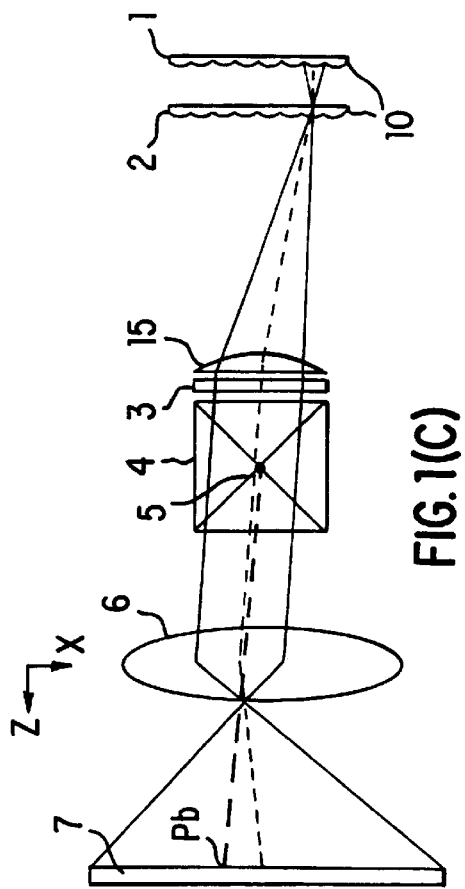
Figure 1C:
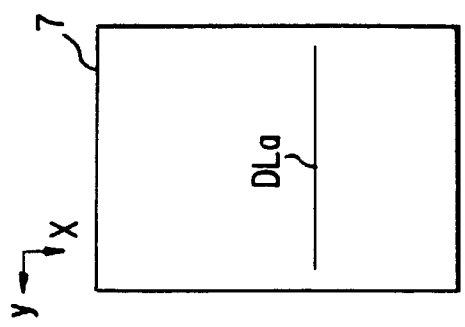
Figure 1D:
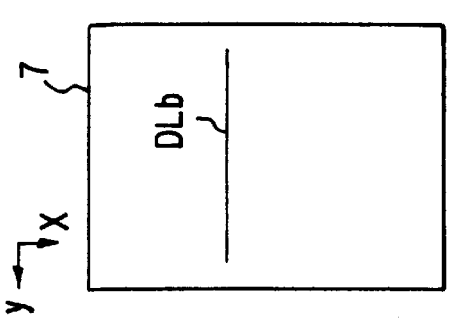
Figure 2:
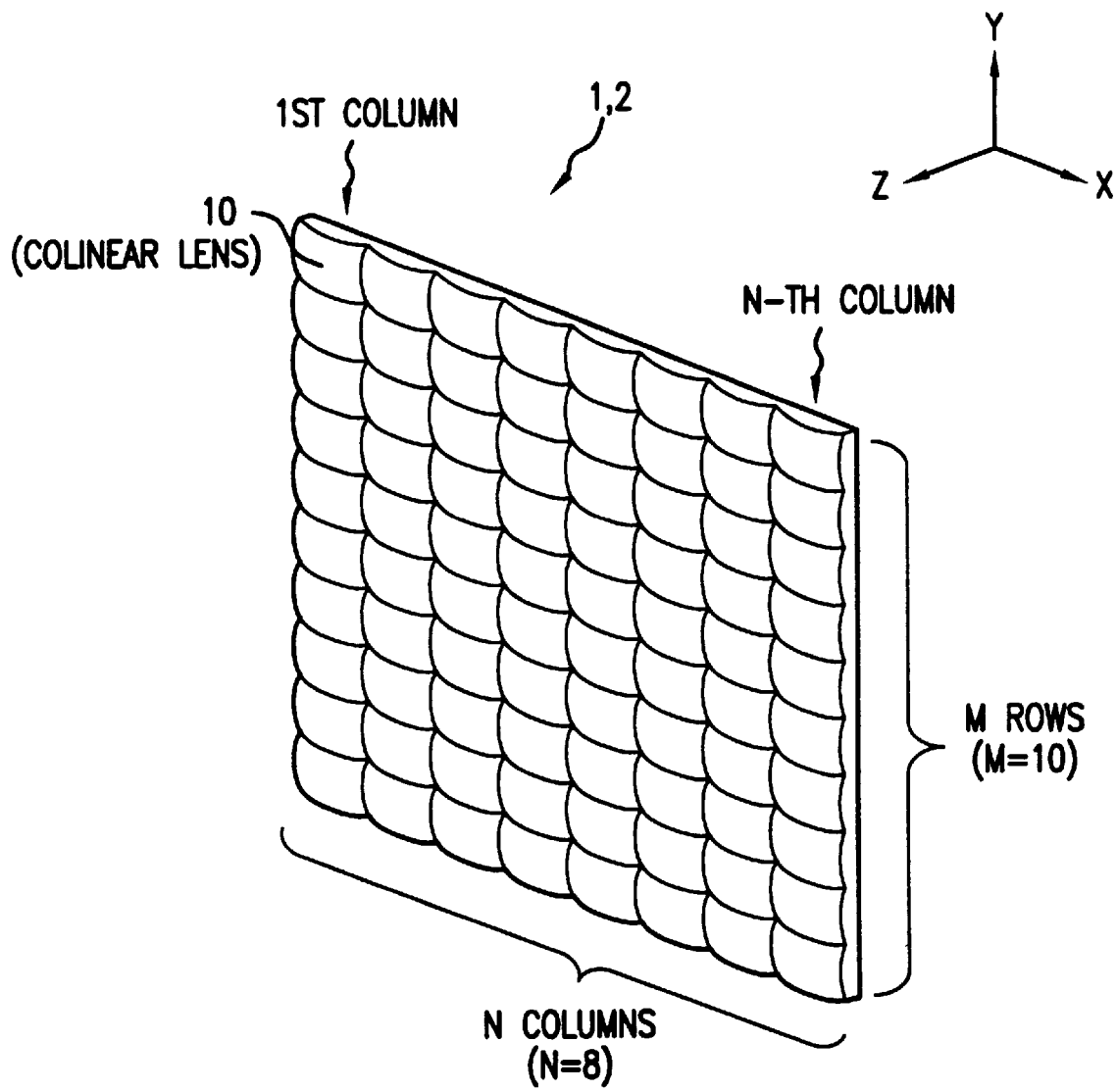
FIG. 2 is an external perspective view showing the first and second lens arrays 1 and 2.
Figure 3A:
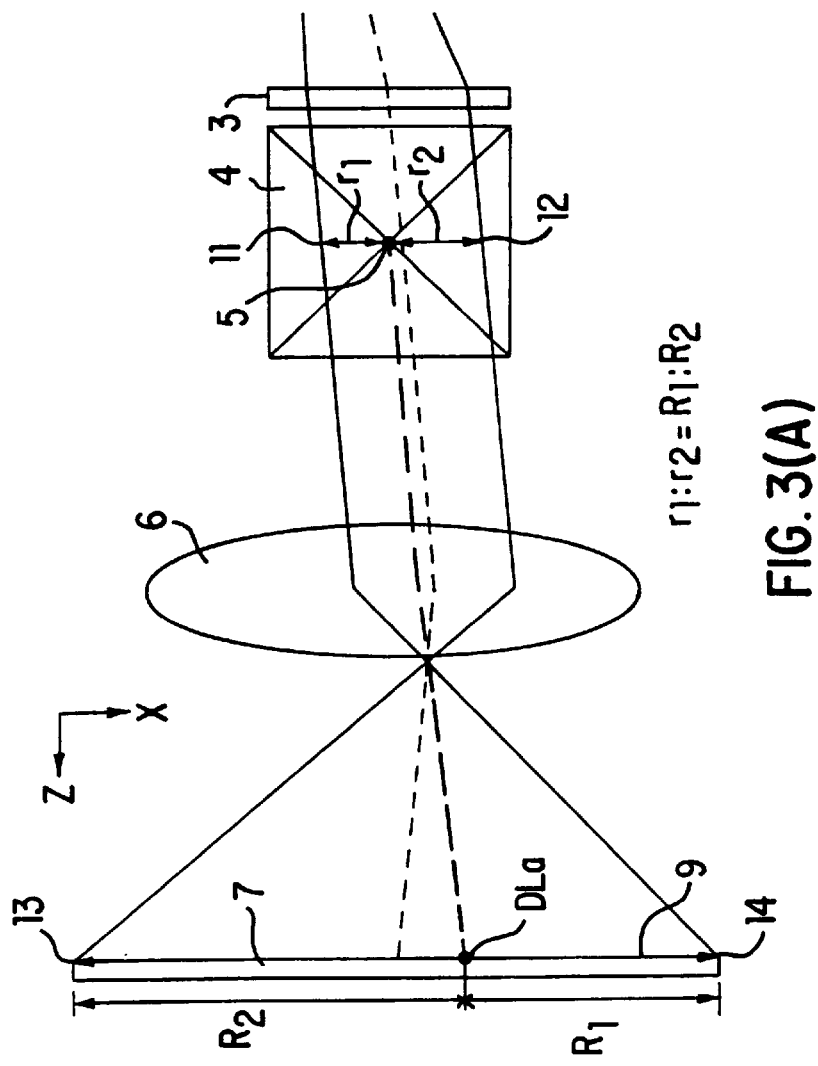
Figure 3B:
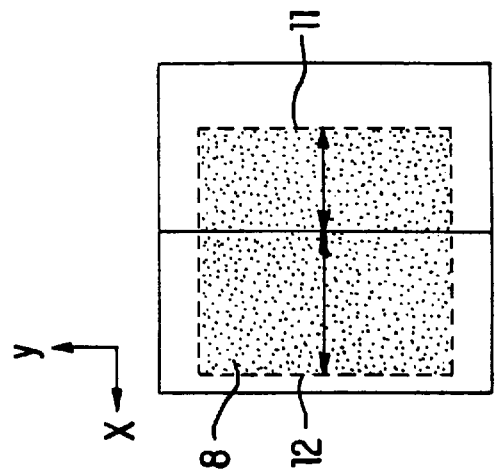
Figure 4:
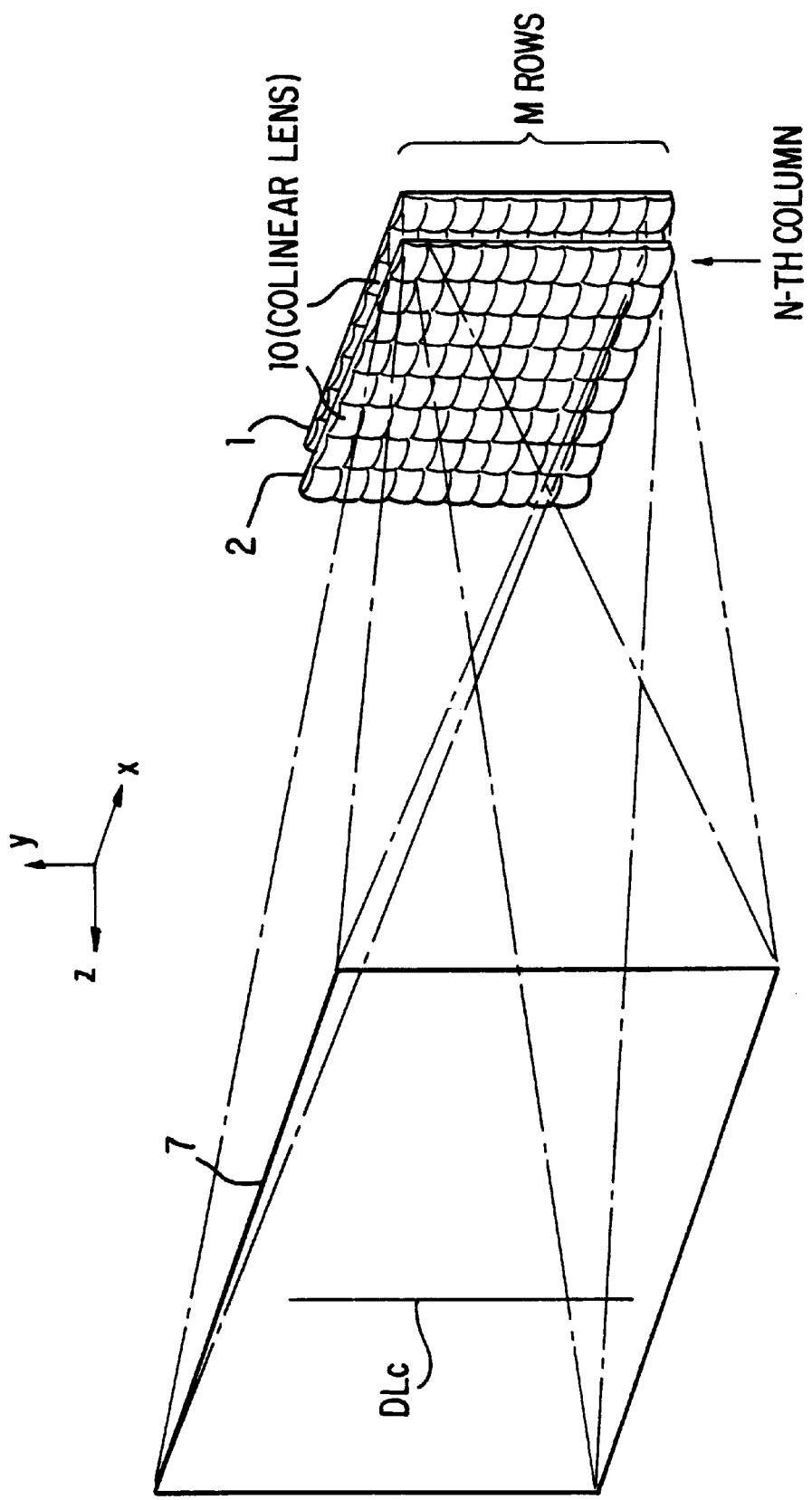
FIG. 4 is an illustration of the concept of the partial light beams transmitted through the small lenses in N-th columns in the two lens arrays 1 and 2 and projected onto the projection screen 7.
Figure 5:
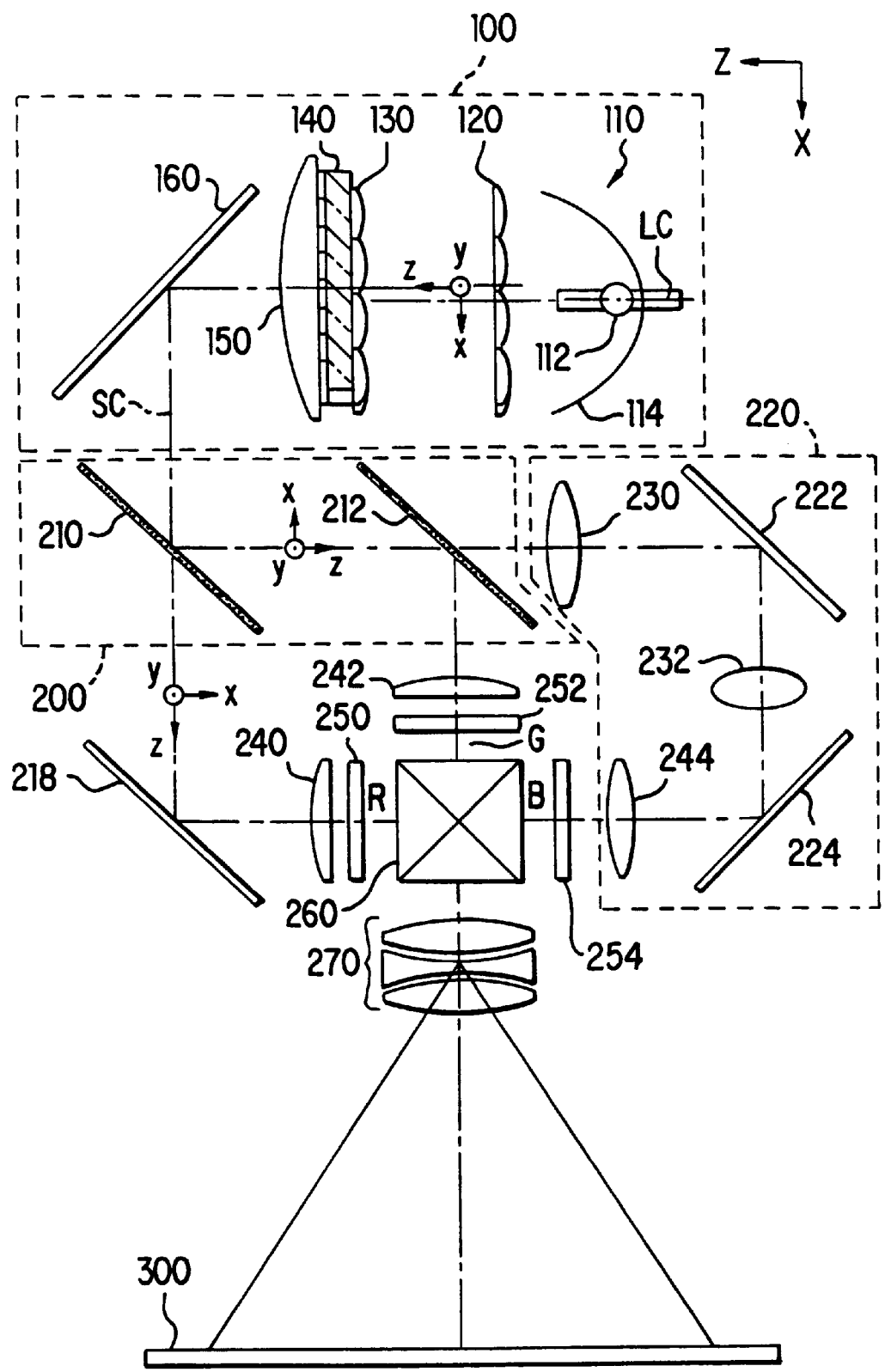
FIG. 5 is a plan view showing the major portion of the projection-type display apparatus of the first embodiment of the present invention.

A. First embodiment:

The embodiments of the present invention are now discussed. FIG. 5 is a plan view showing diagrammatically a major portion of the projection-type display apparatus according to a first embodiment of the present invention. In the following discussion, the direction of travel of light is the z direction, the direction at 3 o'clock about the direction of travel of light (z direction) is the x direction, and the direction at 12 o'clock is the y direction, as shown in FIG. 5. The projection-type display apparatus comprises an illumination optical system 100, dichroic mirrors 210 and 212, reflecting mirrors 218, 222, and 224, an entrance-side lens 230, a relay lens 232, three field lenses 240, 242, and 244, three liquid-crystal light valves (liquid-crystal panel) 250, 252 and 254, a cross-dichroic prism 260, and a projection lens system 270.

The illumination optical system 100 comprises a light source 110, a first lens array 120, a second lens array 130, a polarization conversion device 140, an superimposing lens 150, and a reflecting mirror 160. The illumination optical system 100 is an integrator optical system for illuminating uniformly the three liquid-crystal light valves 250, 252 and 254 as areas of illumination.

The light source 110 comprises a light source lamp 112 as a radiation source for radially emitting light rays, and a concave mirror 114 for reflecting the light rays from the light source lamp 112 in a substantially parallel beam. The concave mirror 114 is preferably a praboloidal mirror.

The first and second lens arrays 120 and 130 function as light beam splitting means. The first lens array 120 splits the light beam from the light source 110 into a plurality of partial beams while condensing each partial light beam at the same time. The second lens array 130 aligns the optical axes of the partial light beams substantially in parallel with the optical axis of the system. The polarization conversion device 140 converts the incident light beam into a predetermined linearly polarized light beam. The superimposing lens 150 superimposes a plurality of partial light beams having central axes in parallel with the system optical axis on predetermined areas of illumination (namely, the liquid-crystal light valves 250, 252 and 254). The field lenses 240, 242 and 244 convert the partial light beams for illuminating areas of illumination into respective light beams in parallel with respective central axes of the areas.

Figure 6:
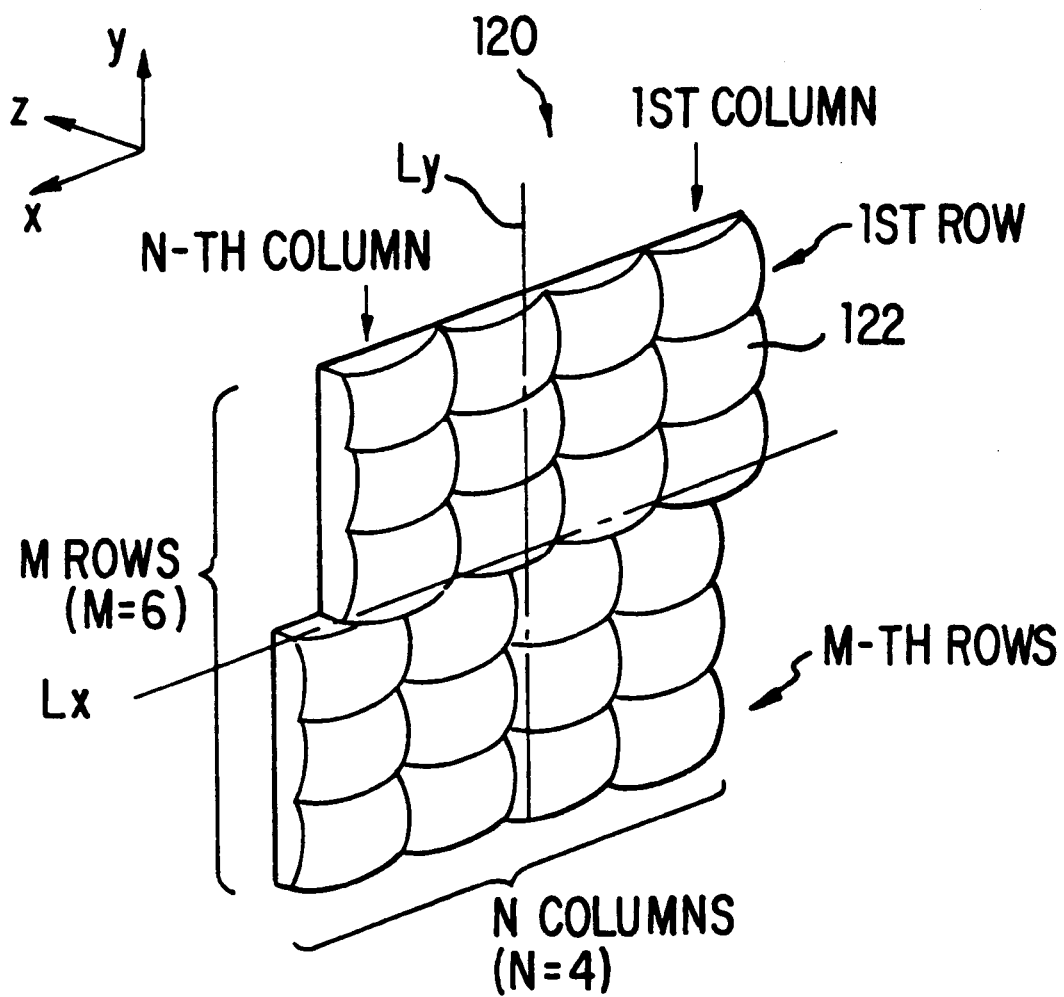
FIG. 6 is a perspective view showing the external appearance of the first lens array 120.

FIG. 6 is a perspective view showing the external appearance of the first lens array 120. The first lens array 120 has a generally rectangular matrix of M rows and N columns of small lenses 122 arranged two-dimensionally. The x direction corresponds to the direction of the rows of lens array and the y direction corresponds to the direction of columns. The lens array here has M=6 and N=4 but may have different numbers of rows and columns. The small lenses from a first row to a third row (first group of rows) and the small lenses from a fourth row to a sixth row (second group of rows) are offset in the directions of −x and +x, respectively from a center line Ly extended in the y direction. Such a lens array may be manufactured by assembling two lens arrays with a displacement allowed therebetween, but more typically, the lens array is manufactured using a one-piece molding technique. The displacement will be detailed further later. The second lens array 130 has a matrix of M rows and N columns of small lenses respectively corresponding to the small lenses 122 in the first lens array 120. Each small lens 122 splits the light beam emitted from the light source 110 (FIG. 5) into a plurality of partial light beams (namely, M×N partial light beams) and focuses each partial light beam in the vicinity of the second lens array 130. The external appearance of each small lens 122, viewed from the z direction, is set to substantially correspond to the shape of the liquid-crystal light valves 250, 252 and 254. The aspect ratio (width-to-height proportions) of the small lens 122 is set to be 4:3 but may be set to other values.

The second lens array 130 aligns the optical axes of the partial light beams in parallel with the optical axis of the system. If the light beam emitted from the light source 110 is a parallel beam in parallel with the system optical axis, the central axes of the partial light beams exiting from the small lenses 122 of the first lens array 120 are also in parallel with the system optical axis, and the second lens array 130 may be dispensed with in such a case. If the light source 110 emits a light beam having a central axis inclined at an angle with respect to the system optical axis, the central axes of the partial light beams exiting from the small lenses 122 are not in parallel with the system optical axis. Partial light beams having a central axis angled with respect to the system optical axis may fail to illuminate the originally intended, predetermined areas of illumination, namely the liquid-crystal light valves 250, 252 and 254. This lowers utilization of light in the projection-type display apparatus. When the partial light beams having central axes inclined at an angle with respect to the system optical axis are introduced into small lenses 132 of the second lens array 130, the second lens array 130 converts the central axes of the partial light beams to be in parallel with the system optical axis thereby resulting in improved utilization of light.

Figure 7A:
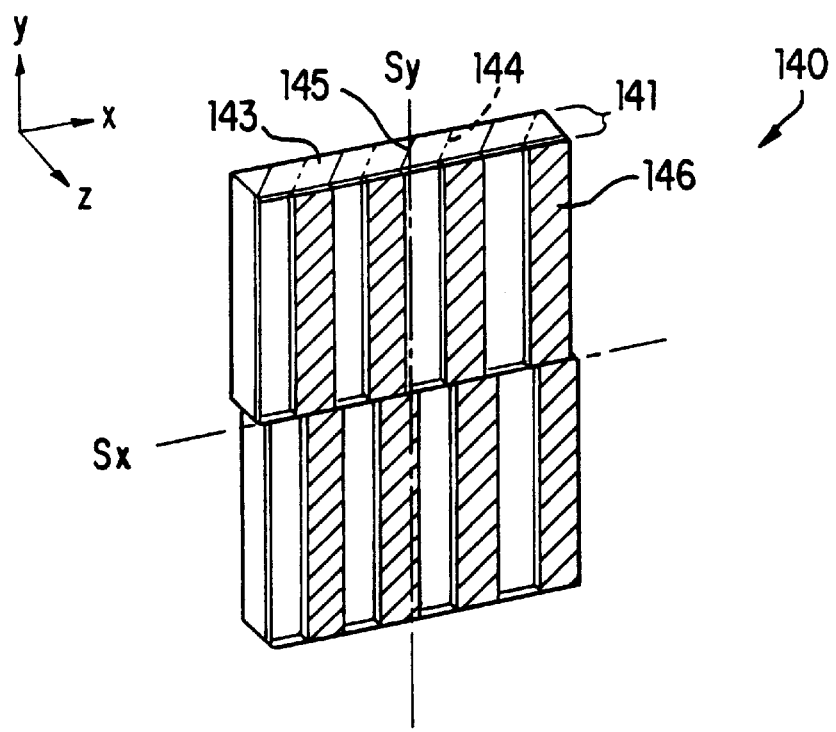
FIGS. 7(A) and 7(B) are explanatory views showing the construction of the polarization conversion device 140.
Figure 7B:
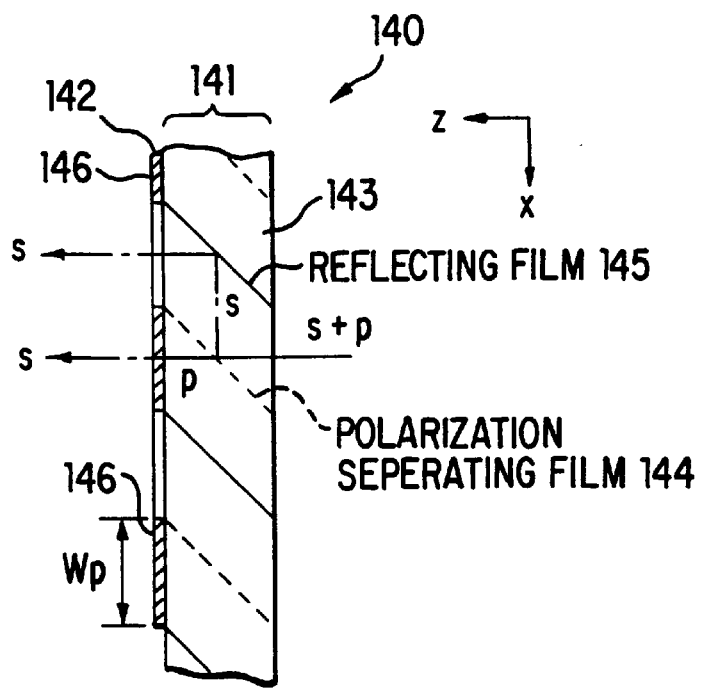

FIGS. 7(A) and 7(B) are explanatory views showing the construction of the polarization conversion device 140 (FIG. 5). As shown in a perspective view of FIG. 7(A), the polarization conversion device 140 comprises a polarizing beam splitter array 141 and a selective phase plate 142. A polarization conversion device corresponding to the small lenses from a top row to the third row and a polarization conversion device corresponding to the small lenses from the fourth row to the sixth row in the first and second lens arrays 120 and 130 as shown in FIG. 6, are offset in the directions of −x and +x, respectively, from a center line Sy extended in the y direction. The displacement of the polarization conversion device will be detailed further later. The polarizing beam splitter array 141 may be constructed by gluing a plurality of transparent plates 143, each having a parallelogram shape in cross section. The interfaces between the transparent plates 143 alternate between a polarization separating film 144 and reflecting film 145. The polarizing beam splitter array 141 is manufactured by gluing a plurality of glass plates with the polarization separating film 144 and the reflecting film 145 alternately interposed therebetween, and by cutting them at a predetermined inclined angle.

Light beams transmitted through the first and second lens arrays 120 and 130 are introduced into the polarization conversion device 140, and then separated into an s-polarized light beam and a p-polarized light beam through the polarization separating film 144 as shown in FIG. 7(B). The p-polarized light beam is transmitted through the polarization separating film 144. The s-polarized light beam is reflected by the polarization separating film 144, is again reflected by the reflecting film 145, and exits in parallel with the p-polarized light beam which is directly transmitted through the polarization separating film 144. The selective phase plate 142 is an optical element that has a $\lambda/2$ phase layer 146 on its light exit surface where the light beam transmitted through the polarization separating film 144 passes, while having no $\lambda/2$ phase layer 146 on its light exit surface where the light beam reflected by the reflecting film 145 passes. The p-polarized light beam transmitted through the polarization separating film 144, before exiting, is converted into an s-polarized light beam through the $\lambda/2$ phase layer 146. As a result, randomly polarized light beams incident on the polarization conversion device 140 are converted into the s-polarized light beams before exiting. Alternatively, the incident light beams may be converted into the p-polarized light beams by forming the $\lambda/2$ phase layer 146 in the selective phase plate 142 on the light exit portion where the light beam reflected from the reflecting film 145 passes.

In the projection-type display apparatus shown in FIG. 5, the parallel light beam emitted from the light source 110 is split into the plurality of partial light beams through the first and second lens arrays 120 and 130, constituting the integrator optical system. With its condensing function, each small lens 122 in the first lens array 120 condenses the partial light beam exiting therefrom to form the image of the light source 110 (a secondary light source image) in the vicinity of the polarization separating film 144 of the polarization conversion device 140. As already described, the partial light beams incident on the polarization conversion device 140 are converted into two types of polarized light beams through the polarization separating film 144 and reflecting film 145. Then it is considered that the secondary light source image is formed on the reflecting film 145 as well as on the polarization separating film 144. More particularly, in the polarization conversion device 140, the secondary light source images, which number is two times as many as that of partial light beams transmitted through the first and second lens arrays 120 and 130, are created.

As an superimposing optical system, the superimposing lens 150 superimposes the partial light beams exiting from the secondary light source images formed in the polarization conversion device 140 to condense them on the liquid-crystal light valves 250, 252 and 254. The reflecting mirror 160 reflects the light beam exiting from the superimposing lens 150 toward the dichroic mirrors 210, but is not necessarily required depending on the construction of the apparatus. As a result, the liquid-crystal light valves 250, 252 and 254 are uniformly illuminated by generally one type of polarized light beams (s-polarized light beams in this embodiment).

As color separating means, the dichroic mirrors 210, 212 separate the white light beam condensed by the superimposing lens 150 into three color light beams of red, green and blue. The first dichroic mirror 210 allows to be transmitted therethrough the red color component of the white light beam emitted from the illumination optical system 100 while reflecting the blue color component and green color component of the white light beam. The red color light beam transmitted through the first dichroic mirror 210 is reflected by a reflecting mirror 218, passes through a field lens 240 and reaches the red-color liquid-crystal light valve 250. The field lens 240 converts the partial light beams exiting from the second lens array 130 into a parallel light beam in parallel with its central axis. The fields lenses 242 and 244 arranged in front of the respective liquid-crystal light valves work in a similar way. The green-color light beam, out of the green-color and blue-color light beams reflected from the first dichroic mirror 210, is reflected by the second dichroic mirror 212, passes through the field lens 242, and reaches the green-color liquid-crystal light valve 252. On the other hand, the blue-color light beam is transmitted through the second dichroic mirror 212, is guided through a relay lens system including the entrance-side lens 230, the relay lens 232, and reflecting mirrors 222 and 224, further pass through the exit-side lens (field lens) 244, and reaches the blue-color liquid-crystal light valve 254. The relay lens system is used for the blue-color light beam to prevent a drop in utilization of light, because the length of the optical path for the blue-color light beam is longer than those of other color light beams. More particularly, the relay lens system is used to transmit the partial light beam incident on the entrance-side lens 230, as it is, to the exit-side lens 244.

Figure 17:
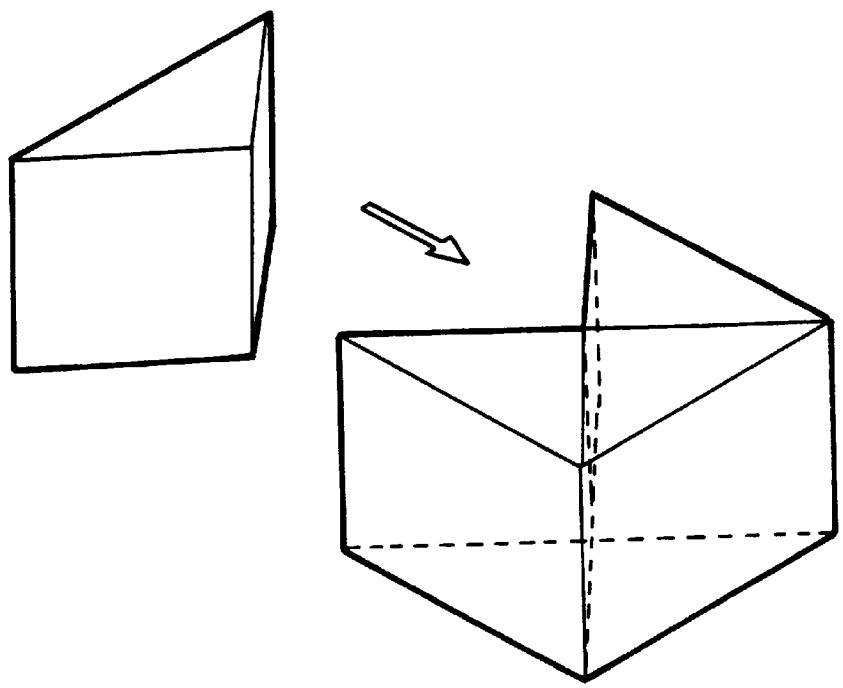
FIG. 17 is an exploded perspective view showing a portion of the cross-dichroic prism 48.
Figure 18A:
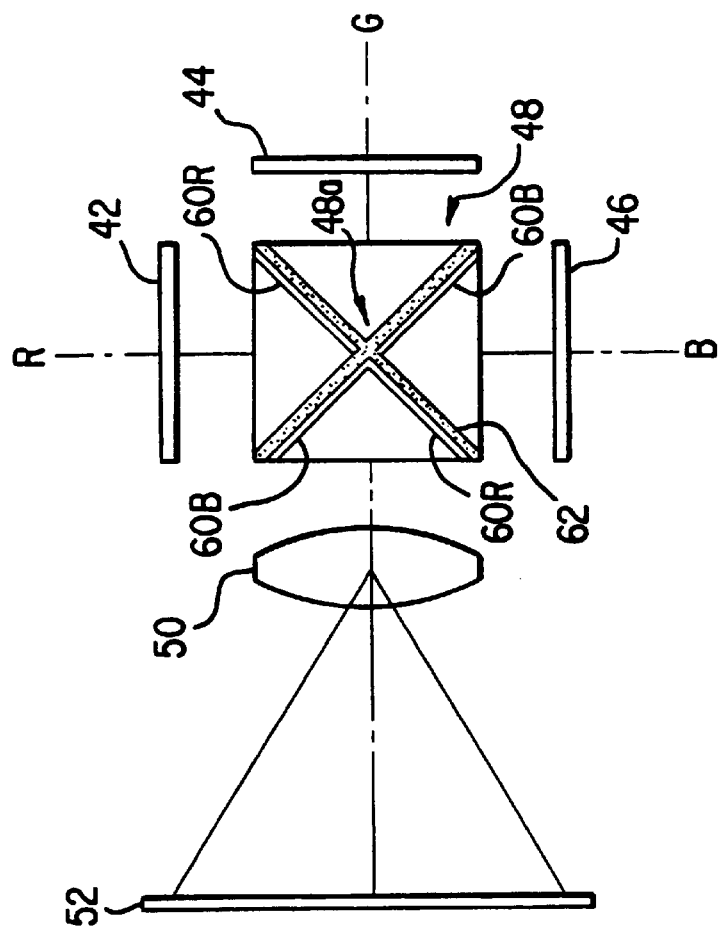
FIGS. 18(A)–18(B) are explanatory views showing the problem that is encountered when the cross-dichroic prism 48 is used.
Figure 18B:
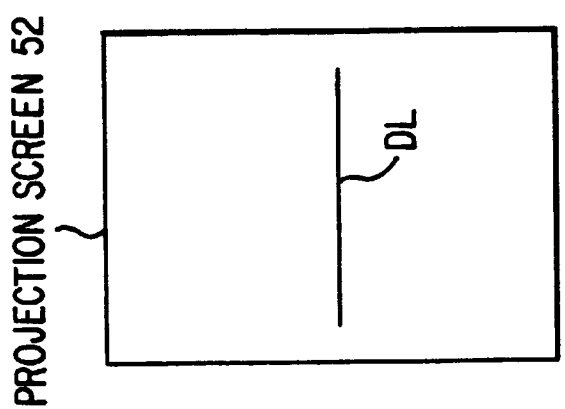

As light modulation means, the three liquid-crystal light valves 250, 252 and 254 form an image by modulating the three color light beams based on given information (the image signal). As color synthesizing means, the cross-dichroic prism 260 synthesizes the three color light beams to form a color image. The construction of the cross-dichroic prism 260 may be identical to that described with reference to FIGS. 17 and 18. More particularly, the cross-dichroic prism 260 includes a multi-layered dielectric film for reflecting a red-color beam and a multi-layered dielectric film for reflecting a blue-color light beam, arranged in the letter X configuration at the interfaces between four right-angle prisms. These multi-layered dielectric films synthesize three color light beams resulting in a synthesized light beam as a color image to be projected. The synthesized light beam produced by the cross-dichroic prism 260 is output toward the projection lens system 270. As a projection optical system, the projection lens system 270 projects the synthesized light beam onto a projection screen 300 to present a color image on screen.

Figure 8A:
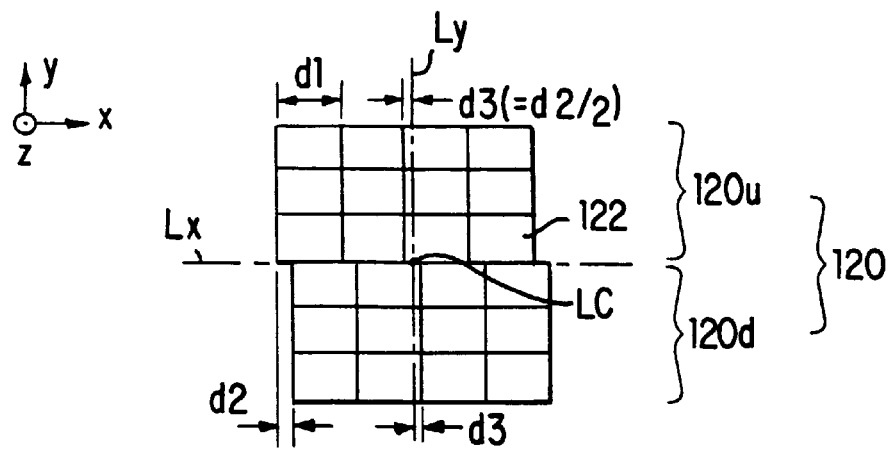
FIGS. 8(A)–8(C) are front views showing the first lens array 120, second lens array 130 and polarization conversion device 140 viewed from the z direction according to the first embodiment.
Figure 8B:
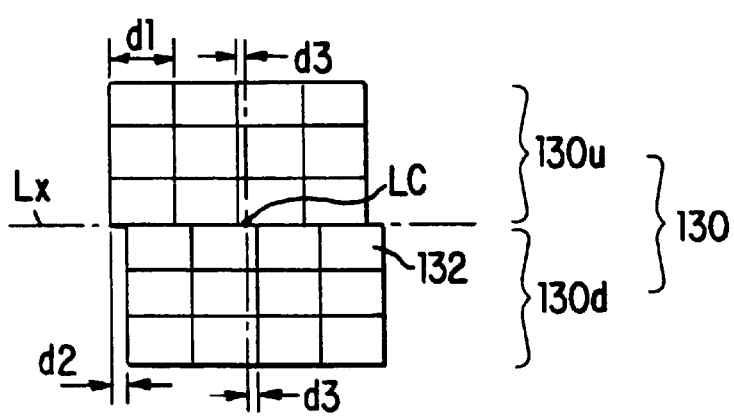
Figure 8C:
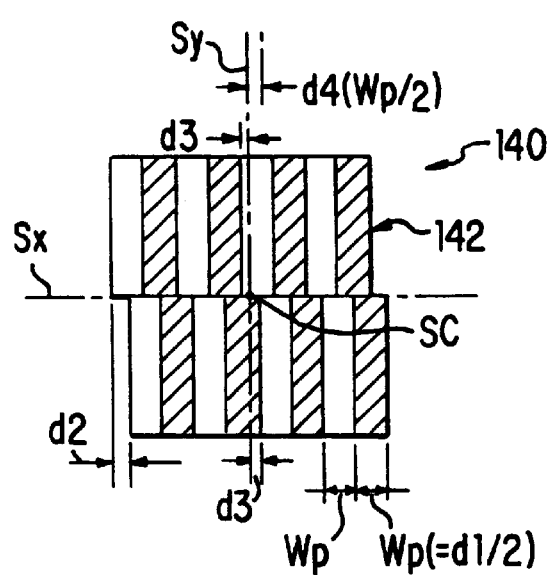

The projection-type display apparatus of the first embodiment shown in FIG. 5 includes the above-described first and second lens arrays 120 and 130, and polarization conversion device 140. FIGS. 8(A)-8(C) are front views of the first lens array 120, second lens array 130 and polarization conversion device 140, viewed from the z direction. The position of the first lens array 120 shown in FIG. 8(A) and the position of the second lens array 130 shown in FIG. 8(B) are based on the y-direction extending center line Ly including the optical axis LC of the light source. The position of the polarization conversion device 140 shown in FIG. 8(C) is based on the y-direction extending center line Sy including the system optical axis SC. There is a displacement of distance d4 in the x direction between both center lines Ly and Sy. Although x-direction extending center lines Lx and Sx, for convenience of explanation, are separately shown for the first lens array 120, second lens array 130 and polarization conversion device 140 in their respective front views, they are actually aligned at the same position in the y direction. More particularly, the light source optical axis LC and the system optical axis SC are at the same position in the y direction but at different positions in the x direction. The center line Ly is identical to the y-direction extending center lines of the first lens array 120 and second lens array 130. The center line Ly is identical to the y-direction extending center line of the polarization conversion device 140. In both the first lens array 120 and second lens array 130, upper portions 120$u$ (from a top row to the third row) and lower portions 120$d$ (from the fourth row to the sixth row) are offset by the displacement d3 from the center line Ly in the directions of −x and +x, respectively. The relative displacement d2 between the upper portions 120$u$ and the lower portions 120$d$ is therefore twice the displacement d3 with respect to the center line Ly. To correspond to the displacement of the first lens array 120 and second lens array 130, the polarization conversion device 140 also has a displacement with its upper portion and lower portion shifted from the center line Sy in the directions of −x and +x, respectively.

As already described, the y-direction extending center line Sy of the polarization conversion device 140 is offset from the center line Ly of the first lens array 120 and second lens array 130 by the displacement d4 in the direction of −x. The displacement d4 is approximately equal to Wp/2, namely half the width Wp of the polarization separating film 144 of the polarization conversion device 140 in the x direction (note that the width of the reflecting film 145 in the x direction is equal to the width of the polarization separating film 144 in the x direction). As already described with reference to FIGS. 7(A) and 7(B), half the light beam incident on the polarization conversion device 140 passes therethrough, and the remaining half the light beam, before being output, is shifted by the width Wp of the film in the direction of −x. The central axis of the two light beams are thus shifted by Wp/2 in the direction of −x from the center of the light beam entering the polarization conversion device 140. The displacement d4 between the y-direction extending center line Sy of the polarization conversion device 140 and the y-direction extending center line Ly of the first lens array 120 and second lens array 130 thus corresponds to the displacement between the incident light beam and the exit light beams in the polarization conversion device 140. With the polarization conversion device 140 positioned in this way, the centers of the small lenses in the first lens array 120 and second lens array 130 are generally aligned with the centers of the polarization separating film 144 in the x direction. Since each partial light beam passing through the respective small lens is directed to approximately the center of the polarization separating film 144, the partial light beams passing through the first lens array 120 and second lens array 130 are efficiently utilized.

FIGS. 9(A) and 9(B) are explanatory views illustrating the function of the first lens array 120, second lens array 130 and polarization conversion device 140 in the first embodiment. FIG. 9(A) shows the optical path of a light beam passing through a small lens at the third row from top, and FIG. 9(B) shows the optical path of a light beam passing through a small lens at the fourth row from top. The optical paths of light beams passing through small lenses at the first and second rows from top are similar to the one for the light beam passing through the third-row small lens shown in FIG. 9(A). The optical paths of light beams passing through small lenses at the fifth and sixth rows from top are similar to the one for the light beam passing through the fourth-row small lens shown in FIG. 9(B). For simplicity, FIGS. 9(A) and 9(B) show only the major portion of the optical paths from the light source 110 to the liquid-crystal light valve 252. Also, FIGS. 9(A) and 9(B) show the optical paths of the light beams passing through the second-column small lenses in the first lens array 120 and second lens array 130.

Referring to FIG. 9(A), a partial light beam L32 split by the small lens 122 at the third row in the first lens array 120 is condensed on the polarization separating film 144 in the polarization conversion device 140. A partial light beam L32$a$ out of the light beam L32 is directly transmitted through the polarization separating film 144 and illuminates an area of illumination 252$a$ of the liquid-crystal light valve 252 through the light condensing effect of the superimposing lens 150. A partial light beam L32$b$, which is reflected by the polarization separating film 144 and further by the reflecting film 145, also illuminates the area of illumination 252$a$. The two partial light beams L32$a$ and L32$b$ are transmitted through the center of the area of illumination 252$a$ with their respective central axes 32$acl$ and 32$bcl$ angled at respective angles of incidence θ32$a$ and θ32$b$ to the area of illumination 252$a$.

Referring to FIG. 9(B), a partial light beam L42 split by the small lens 122 at the fourth row in the first lens array 120 is condensed on the polarization separating film 144 in the polarization conversion device 140. A partial light beam L42$a$ out of the light beam L42 is directly transmitted through the polarization separating film 144 and illuminates an area of illumination 252$a$ of the liquid-crystal light valve 252 through the light condensing effect of the superimposing lens 150. A partial light beam L42$b$, which is reflected by the polarization separating film 144 and further by the reflecting film 145, also illuminates the area of illumination 252$a$. The two partial light beams L42$a$ and L42$b$ are transmitted through the center of the area of illumination 252$a$ with their respective central axes 42$acl$ and 42$bcl$ angled at respective angles of incidence θ42$a$ and θ42$b$ to the area of illumination 252$a$.

Since the third row and fourth row are mutually displaced (offset) with respect to the center line Ly in the x direction in the first lens array 120 and second lens array 130, the partial light beam L32 (later split into L32a and L32b) and the partial light beam L42 (later split into L42a and L42b) arrive at the superimposing lens 150 at different entrance positions in the x direction. As a result, the angles of incidence θ32 (θ32a and θ32b) of the partial light beam L32 incident on the area of illumination 252a and the angles of incidence θ42 (θ42a and θ42b) of the partial light beam L42 incident on the area of illumination 252a are different from each other. Referring to FIGS. 9(A) and 9(B), θ42b<θ32b<θ42a<θ32a.

Figure 10:
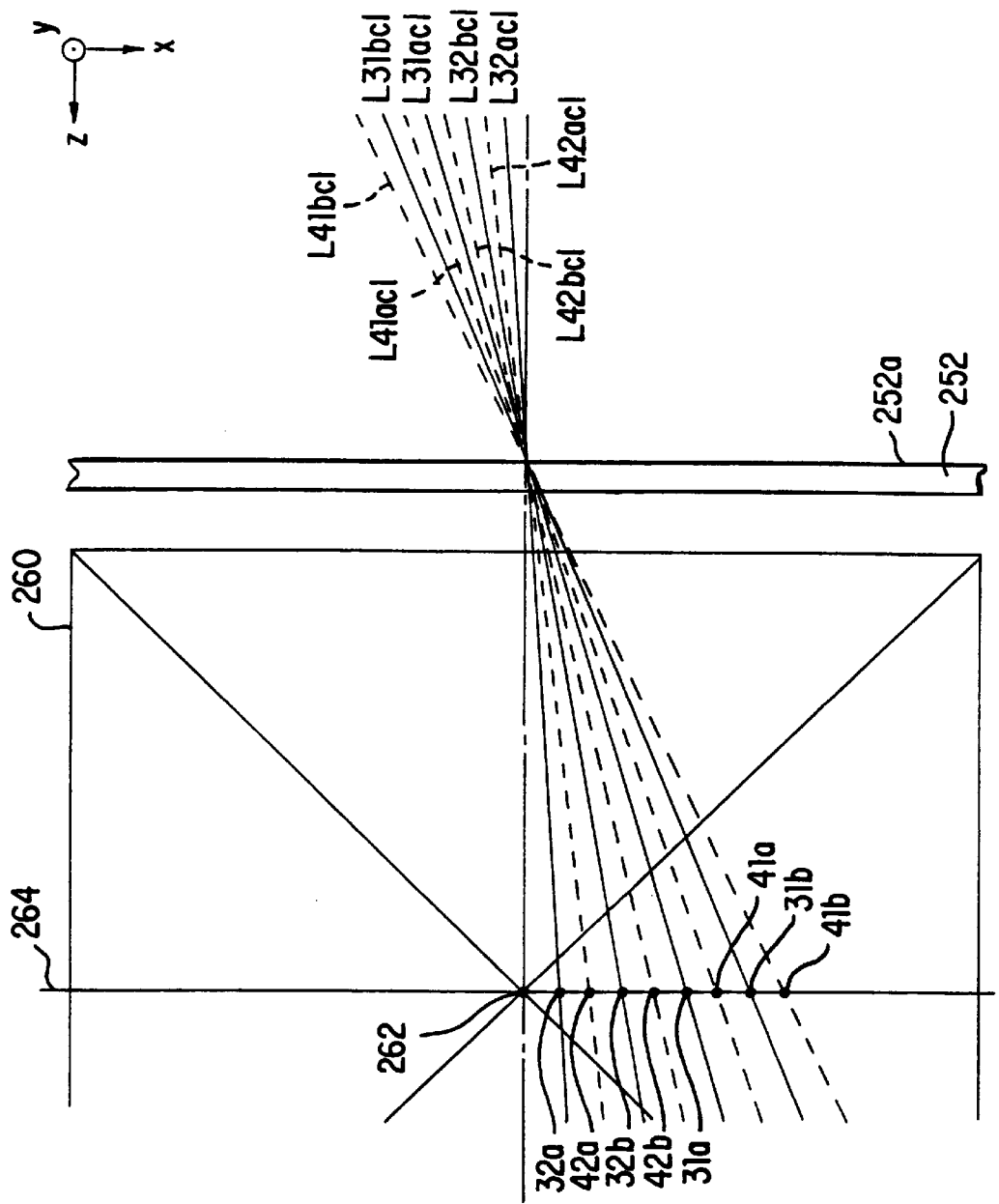
FIG. 10 is an explanatory view showing how the partial light beams transmitted through the third and fourth rows in the first and second lens arrays 120 and 130 are transmitted through the cross-dichroic prism 260.

FIG. 10 is an explanatory view showing how the partial light beams transmitted through the third row and fourth row in the first lens array 120 and second lens array 130 are transmitted through the cross-dichroic prism 260. For simplicity, components not required for explanation purpose are omitted here. The full lines shown represent central axes L31bcl and L31acl of the partial light beams transmitted through a small lens in the third row and the first column and central axes L32bcl and L32acl of the partial light beams transmitted through a small lens in the third row and the second column. The broken lines shown represent central axes L41bcl and L41acl of the partial light beams transmitted through a small lens in the fourth row and the first column and central axes L42bcl and L42acl of the partial light beams transmitted through a small lens in the fourth row and the second column. The central axes L31bcl, L31acl, L32bcl and L32acl of the partial light beams transmitted through small lenses in the third row and first and second columns pass the center of the area of illumination 252a, enter the cross-dichroic prism 260, and pass at different points 31b, 31a, 32b and 32a on a central plane 264 which the central axis 262 of the cross-dichroic prism 260 lies in and which is in parallel with the liquid-crystal light valve 252. As already described in connection with the principle of dark line generation, the dark lines that are caused by the partial light beams transmitted through the small lens in the third row and the first and second columns have a pitch generally proportional to the distance between each passing point and the central axis 262. The central axes L41bcl, L41acl, L42bcl and L42acl of the partial light beams transmitted through small lenses in the fourth row and first and second columns pass the center of the area of illumination 252a, enter the cross-dichroic prism 260, and pass at different points 41b, 41a, 42b and 42a on the central plane 264. Since as already described with reference to FIGS. 9(A) and 9(B), the angle of incidence to the area of illumination 252a, of the central axis of each partial light beam transmitted through the small lens at the fourth row is different from the angle of incidence of the central axis of each partial light beam transmitted through the small lens at the third row, the points 41b, 41a, 42b and 42a are placed in the middle between the points 31b, 31a, 32b and 32a, respectively. As a result, the dark lines caused by the partial light beams transmitted through the small lenses in the fourth row and the first column and second column appear in the middle between the partial light beams at the third row. The dark lines formed by the M partial light beams split in the same column (the partial light beams in one column in the first lens array 120 in this embodiment) are not concentrated at one position and are thus made less visible.

The dark lines arising from the M partial light beams in the same column are presented in two positions correspondingly to the upper and lower portions of the first lens array 120 and second lens array 130. Each of the M partial light beams in the same column is originally separated into one beam by the polarization separating film 144 and another beam by the reflecting film 145 in the polarization conversion device 140, and create two dark lines. The "two positions corresponding to the upper and lower portions" means therefore that each of the two dark lines is further separated into two dark lines.

As described above, the intervals between the dark lines are proportional to the intervals between each of the points 31b, 32a, 32b, 32a, . . . and 41b, 41a, 42b, 42a, . . . and the central axis 262 on the central plane 264. To make the dark lines less visible, it is preferred that the dark lines arising from the partial light beams are not superimposed and that the points 41b, 41a, 42b, 42a, . . . are mutually interposed in the middle between the points 31b, 32a, 32b, 32a, . . . , respectively. The interval between the dark lines is preferably set to be as wide as possible, and the points 41b, 41a, 42b, 42a, . . . are preferably mutually interposed in the middle between the points 31b, 32a, 32b, 32a, . . . , respectively. For example, the displacement d2 between the first lens array 120 and the second lens array 130 shown in FIGS. 8(A)–8(C) are preferably ¼ of width d1 of the small lens 122 in the x direction. With this arrangement, the points 41b, 41a, 42b, 42a, . . . are mutually interposed in the middle between the points 31b, 32a, 32b, 32a, . . . , respectively. The preferred relationship of the displacements between the first lens array 120, second lens array 130 and polarization conversion device 140 in this embodiment is summarized as follows.

$$d2=d1/4,\ d3=d2/2,\ d4=d1/4 \tag{1}$$

where d1 represents the width of the small lens in the x direction.

Although this embodiment has been discussed in connection with the projection-type display apparatus incorporating the polarization conversion device 140, the present invention may be implemented in a display apparatus without the polarization conversion device 140. This arrangement is equivalent to the state of the first embodiment in which the partial light beams arising from the reflecting film 145 in the polarization conversion device 140 are not present, and it is sufficient enough if the displacement d2 between the first lens array 120 and the second lens array 130 shown in FIGS. 8(A)–8(C) are set to be ½ of the width d1 of the small lens 122 in the x direction. Furthermore, when the polarization conversion device 140 is dispensed with, it is not necessary to separate the second lens array 130 and the superimposing lens 150 and a lens array having the functions of the first lens array 120 and superimposing lens 150 (FIG. 5) may be employed. When the polarization conversion device 140 is not used, the relationship of the displacements in the first lens array 120 and second lens array 130 is summarized as follows.

$$d2=d1/2,\ d3=d2/2 \tag{2}$$

where d1 represents the width of the small lens in the x direction.

In this embodiment, the small lenses in rows of the first lens array 120 and the second lens array 130 are divided into two groups and the small lenses in the first group are offset from the small lenses in the second group. Instead of this arrangement, it may be possible that the small lenses are divided into three groups every two rows so that one group of rows is arranged to be offset from adjoining groups. In other words, it is enough that the first and second lens array are divided into a plurality of groups of rows, each of the groups including at least two rows of small lenses and is offset from adjoining groups. With this arrangement as well, the central axis of the color synthesizing device is prevented from being projected at the same position by the partial light beams arranged in the direction of columns. As a result, the dark line created in the image projected is made less visible.

Figure 11A:
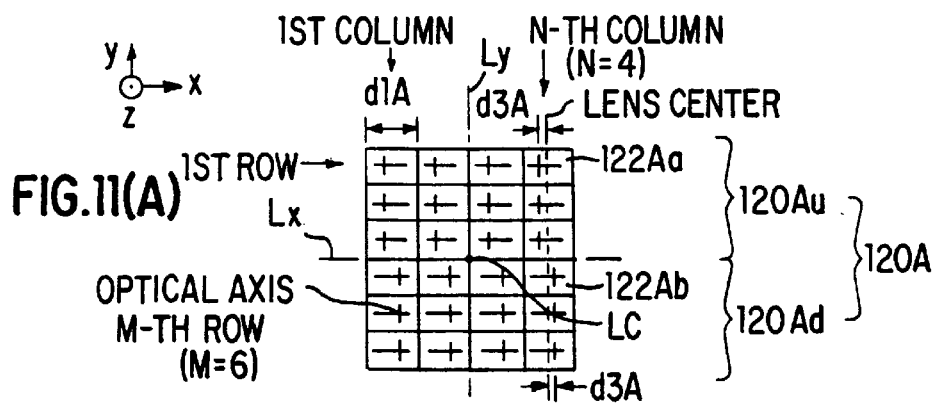
FIGS. 11(A)–11(D) are front views showing the first lens array 120A, second lens array 130A and polarization conversion device 140A viewed from the z direction according to the second embodiment.
Figure 11B:
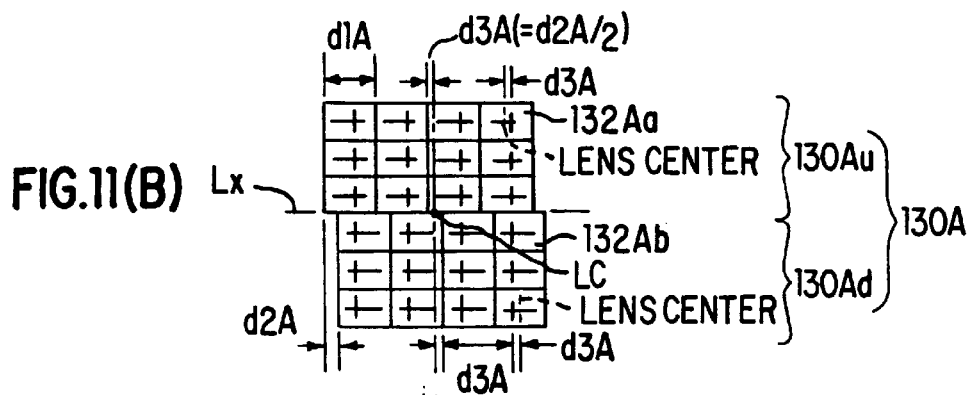
Figure 11C:
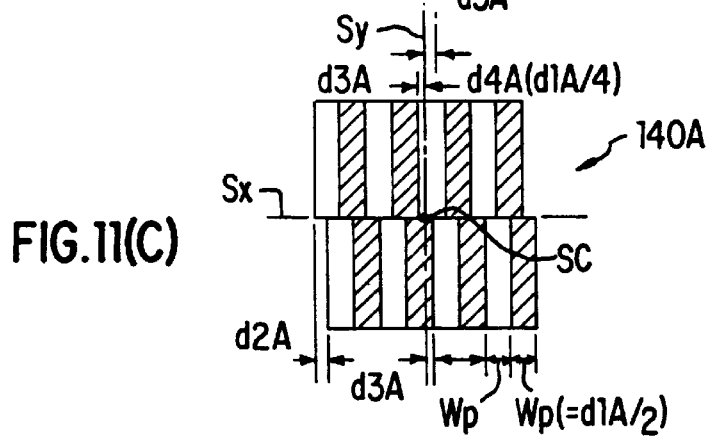

B. Second embodiment:

FIGS. 11(A)–11(C) are front views of a first lens array 120A, a second lens array 130A and a polarization conversion device 140A in a second embodiment, viewed from the z direction.

The first lens array 120A has a matrix of M rows and N columns of small lenses (M=6, N=4) with no displacement therebetween. On the other hand, the second lens array 130A has an upper portion 130Au (from the top row to the third row) and a lower portion 130Ad (from the fourth row to the sixth row) offset respectively in the directions of −x and +x by a displacement d3A with respect to the center line Ly. The relative displacement d2A between the upper portion 130Au and the lower portion 130Ad is twice as large as the displacement d3A relative to the center line Ly.

The polarization conversion device 140A also includes the displacement (offset) d3A in its structure with respect to the center line Sy in the directions of −x and +x to correspond to the displacement between the upper portion 130Au and the lower portion 130Ad in the second lens array 130. The center line Sy is offset from the center line Ly in the direction of −x by a displacement d4A approximately equal to half the x-direction width Wp of the polarization separating film 144 or the reflecting film 145 in the polarization conversion device 140A so that the center of each small lens is generally aligned with the center of the respective polarization separating film 144 of the polarization conversion device 140A in the x direction. Since the components and basic functions of the polarization conversion device 140 remain unchanged from those of the polarization conversion device 140 shown in FIG. 7, no further discussion about them is provided.

Small lenses 120A, 130A in the first and second lens arrays 120, 130 of this second embodiment are different from the small lenses 122 in the first and second lens arrays 120, 130 of the first embodiment. The small lens 122 in the first embodiment has its lens optical axis (optical center) aligned with its lens center (geometric center). The small lens constituting the first and second lens arrays 120A, 130A in the second embodiment is a decentered lens in which its lens optical axis is not aligned with the lens center. Referring to FIGS. 11(A) and 11(B), a full line cross drawn in each small lens represents the optical axis of each small lens.

Figure 11D:
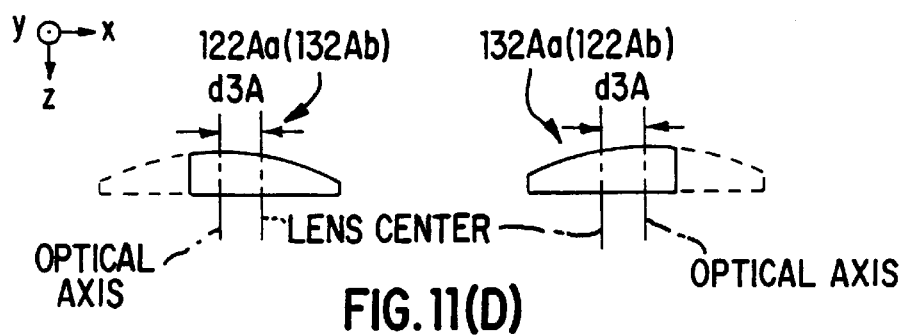

The optical axis of each small lens 122Aa in the upper portion 120Au (from the top row to the third row) in the first lens array 120A is offset by a displacement d3A from the lens center of the small lens in the direction of −x, and the optical axis of the corresponding small lens 132Aa in the upper portion 130Au in the second lens array 130A is shifted by a displacement d3A from its lens center in the direction of +x. On the other hand, the optical axis of each small lens 122Ab in the lower portion 120Ad (from the fourth row to the sixth row) in the first lens array 120A is offset by a displacement d3A from the lens center of the small lens in the direction of +x, and the optical axis of the corresponding small lens 132Ab in the lower portion 130Ad in the second lens array 130A is shifted by a displacement d3A from its lens center in the direction of −x. FIG. 11(D) shows examples of the structure of small lenses (decentered lenses) with their optical axes shifted as described above. As shown, small lenses 122Aa (132Ab) and 132Aa (122Ab) are decentered lenses which are manufactured by cutting a spherical lens in a predetermined shape so that its optical axis is shifted (offset) from its center. More typically, the entire lens array is formed using a one-piece molding technique. The displacement between the optical axis and the lens center in each of the lenses 122Aa, 122Ab, 132Aa and 132Ab is equal to the displacement d3A of the upper and lower portions with respect to the center line Ly.

Figure 12A:
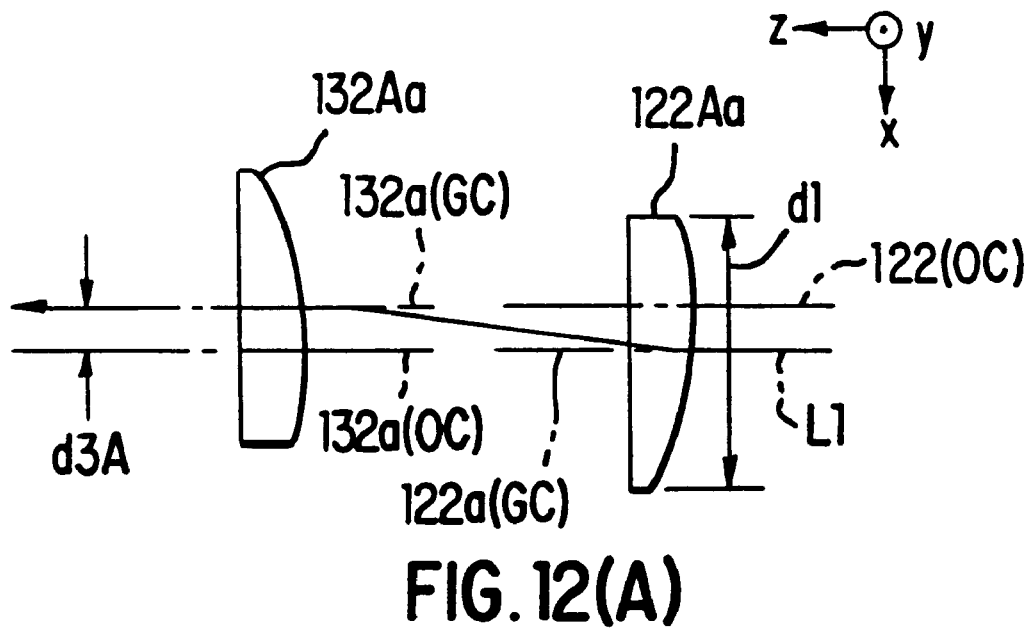
FIGS. 12(A) and 12(B) are explanatory enlarged views showing parts of the first and second lens array 120A and 130A.
Figure 12B:
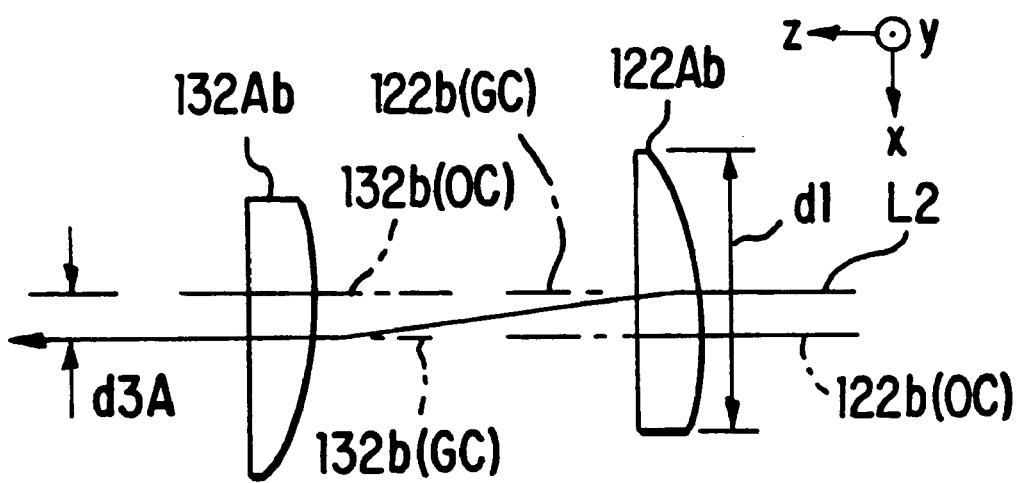

FIGS. 12(A) and 12(B) are explanatory enlarged views showing small lenses of the first and second lens arrays 120A and 130A. FIG. 12(A) shows small lenses in the upper portion viewed from the y direction and FIG. 12(B) shows small lenses in the lower portion viewed from the y direction. As shown in FIG. 12(A), both the small lens 122Aa in the upper portion in the first lens array 120A and the corresponding small lens 132Aa in the second lens array 130A are arranged such that the lens center 122a(GC) of the small lens 122Aa is aligned with the optical axis 132a(OC) of the small lens 132Aa while the optical axis 122a(OC) of the small lens 122Aa is aligned with the lens center 132a (GC) of the small lens 132Aa at the same time. As shown in FIG. 12(B), both the small lens 122Ab in the lower portion in the first lens array 120A and the corresponding small lens 132Ab in the second lens array 130A are arranged such that the lens center 122b(GC) of the small lens 122Ab is aligned with the optical axis 132b(OC) of the small lens 132Ab while the optical axis 122b(OC) of the small lens 122Ab is aligned with the lens center 132b(GC) of the small lens 132Ab at the same time. The central axis of a partial light beam L1 incident on the small lens 122Aa is deflected by the small lens 122Aa so that it passes through the center of the corresponding small lens 132Aa. After passing through the small lens 132Aa, the deflected partial light beam L1 is deflected back again such that it becomes parallel with its direction of travel prior to incidence on the small lens 122Aa. As a result, the optical path of the partial light beam L1 is shifted in parallel by the displacement d3A in the direction of −x with respect to its path prior to incidence on the small lens 122Aa. Similarly, a partial light beam L2 incident on the small lens 122b is shifted in parallel by the displacement d3A with respect to its path prior to incidence on the small lens 122Ab through the deflection functions by the small lenses 122b and 132b. The optical paths of the partial light beams passing the same column in the upper portion and lower portion of the first and second lens arrays 120A, 130A are therefore subject to a relative displacement equal to twice the displacement d3A.

FIGS. 13(A) and 13(B) are explanatory views illustrating the function of the first and second lens arrays 120A, 130A and polarization conversion device 140A in the second embodiment.

FIG. 13(A) shows two partial light beams L32Aa and L32Ab passing through the third row and the second column in the first and second lens arrays 120A and 130A. Two partial light beams L32Aa and L32Ab are transmitted through the center of the area of illumination 252a with their respective central axes 32Aacl and 32Abcl angled at respective angles of θ32Aa and θ32Ab to the area of illumination 252a.

FIG. 13(B) shows two partial light beams L42Aa and L42Ab passing through the fourth row and the second column in the first and second lens arrays 120A and 130A. Two partial light beams L42Aa and L42Ab are transmitted through the center of the area of illumination 252a with their respective central axes 42Aacl and 42Abcl angled at respective angles of θ42Aa and θ42Ab to the area of illumination 252a.

The partial light beam L32A (including L32Aa and L32Ab) and the partial light beam L42A (including L42Aa and L42Ab) arrive at the superimposing lens 150 at different entrance positions in the x direction through the deflection functions of the small lenses 122Aa and 132Aa and 122Ab and 132Ab in the respective first and second lens arrays 120A and 130A as already described. As a result, the angles of incidence of the central axes of the partial light beams, namely the angles of incidence $\theta$32A ($\theta$32Aa and $\theta$32Ab) of the partial light beam L32A and the angles of incidence $\theta$42A ($\theta$42Aa and $\theta$42Ab) of the partial light beam L42A are different to each other. In this embodiment, $\theta$32Ab<$\theta$42Ab<$\theta$32Aa<$\theta$42Aa. If the angles of incidence of the partial light beams are different, the positions of the dark lines formed by these partial light beams are also different as described above in conjunction with the first embodiment. The dark lines formed by the M partial light beams split in the same column are not concentrated at one position and are thus made less visible. The dark lines arising from the M partial light beams in the same column are presented in two positions correspondingly to the upper and lower portions of the first lens array 120A and second lens array 130A.

As already described in connection with the first embodiment, to make the dark lines less visible, it is preferred that the dark lines arising from the partial light beams are not superimposed and that the intervals between the dark lines are spaced as wide as possible. To this end, the displacement d2A between the upper portion and the lower portion of the second lens array 130A shown in FIGS. 11(B) and 11(C) are preferably set to be ¼ of the width d1A of the small lens 132A (132Aa, 132Ab) so that the dark lines generated by the columns in the lower portion are interposed in the middle of the respective intervals of the dark lines generated by the partial light beams of the upper portion. With this arrangement, each dark line is formed in the middle of the interval between respective dark lines generated by the upper portion light beams. The preferred relationship of the displacements between the first lens array 120A, second lens array 130A and polarization conversion device 140A in the second embodiment is summarized as follows.

$$d2A=d1A/4, d3A=d2A/2, d4A=d1A/4 \qquad (3)$$

where d1A represents the width of the small lens in the x direction.

Although this embodiment has been discussed in connection with the projection-type display apparatus incorporating the polarization conversion device 140A, the present invention may be implemented in a display apparatus without the polarization conversion device 140A as in the first embodiment. This arrangement is equivalent to the state of the second embodiment in which the partial light beams arising from the reflecting film 145 in the polarization conversion device 140 are not present, and it is sufficient enough if the displacement d2 in the second lens array 130A shown in FIG. 11(B) is set to be ½ of the width d1A of the small lens 132A (132Aa and 132Ab) in the x direction. When the polarization conversion device 140A is not used, the relationship of the displacements in the first lens array 120A and second lens array 130A is summarized as follows.

$$d2A=d1A/2, d3A=d2A/2 \qquad (4)$$

where d1A represents the width of the small lens in the x direction.

Figure 14A:
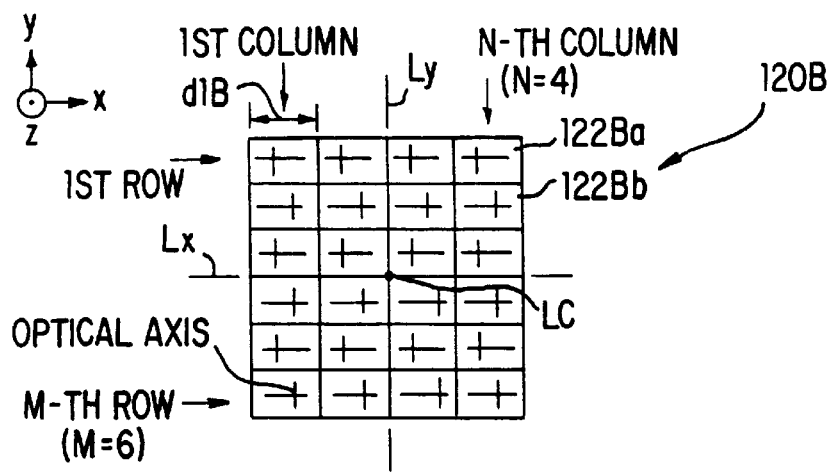
FIGS. 14(A)–14(C) are front views showing the first lens array 120B, second lens array 130B and polarization conversion device 140B viewed from the z direction according to the third embodiment.
Figure 14B:
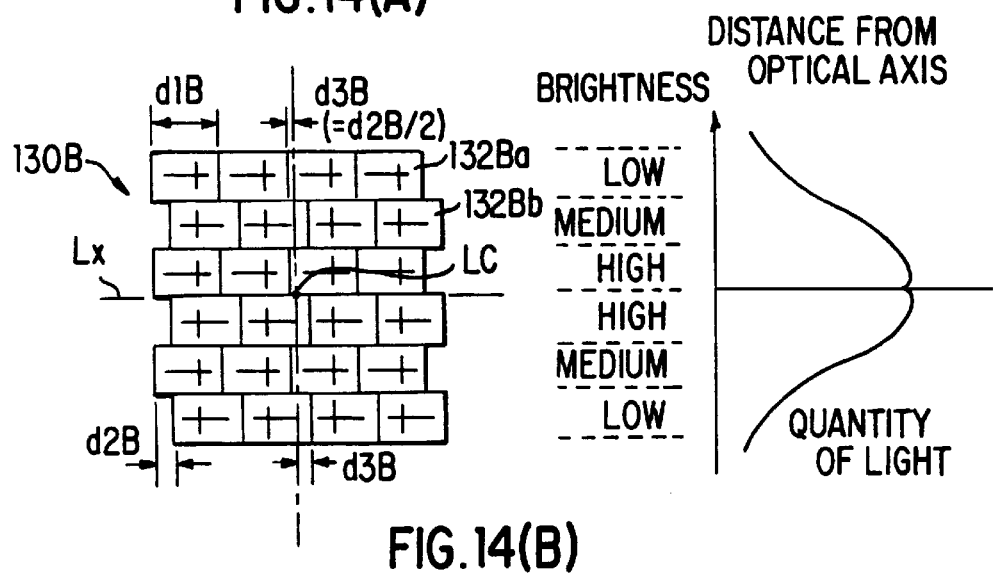
Figure 14C:
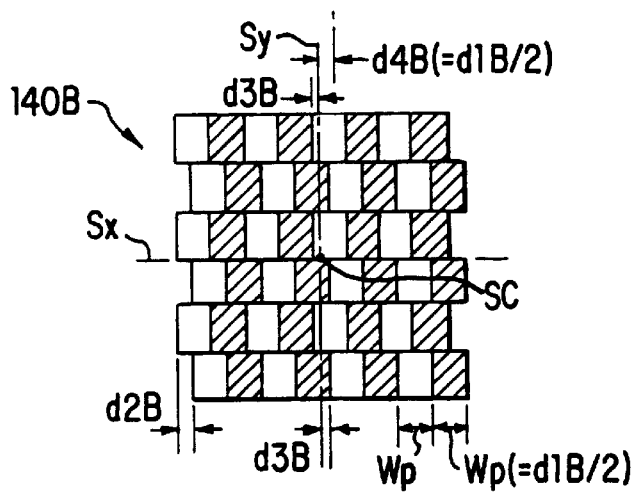

C. Third embodiment:

FIGS. 14(A)–14(C) are front views of a first lens array 120B, a second lens array 130B and a polarization conversion device 140B in a third embodiment, viewed from the z direction.

The third embodiment has odd-numbered rows and even-numbered rows in the second lens array 130B shifted respectively in the directions of −x and +x by a displacement d3B with respect to the center line Ly. The displacement d2B of the even-numbered rows relative to the odd-numbered rows is equal to twice the displacement d3B with respect to the center line Ly.

The optical axis of each small lens 122Ba in the odd-numbered rows in the first lens array 120B is shifted by a displacement d3B from the lens center of the small lens in the direction of −x, and the optical axis of the corresponding small lens 132Ba in the second lens array 130B is shifted by a displacement d3B from its lens center in the direction of +x. As already described with reference to FIGS. 12(A) and 12(B), the lens center is aligned with the optical center between both small lenses in the x direction. The optical axis of each small lens 122Bb in the even-numbered rows in the first lens array 120B is shifted by a displacement d3B from the lens center of the small lens in the direction of +x as in the odd-numbered rows, and the optical axis of the corresponding small lens 132Bb in the second lens array 130B is shifted by a displacement d3B from its lens center in the direction of −x. The lens center is aligned with the optical center between both small lenses in the x direction.

The polarization conversion device 140B also includes its odd-numbered rows and even-numbered rows shifted by a displacement d3A in its structure with respect to the center line Sy in the directions of −x and +x, respectively, to correspond to the displacement in the second lens array 130B. The center line Sy is shifted from the center line Ly in the direction of −x by a displacement d4 approximately equal to half the x-direction width Wp of the polarization separating film 144 or the reflecting film 145 in the polarization conversion device 140 so that the center of each small lens in the second lens array 130B is generally aligned with the center of the respective polarization separating film 144 in the x direction.

Like the second embodiment, the third embodiment relatively shifts, in the x direction, the partial light beams transmitted through the odd-numbered rows from the partial light beams transmitted through the even-numbered rows in the second lens array 120B. Since the dark lines formed by the partial light beams arranged in the same column are separated into ones arising from the partial light beams through the odd-numbered rows and ones arising from the partial light beams through the even-numbered rows, the dark lines are made less visible.

The third embodiment has also the following advantage. The light source 110 presents the highest brightness in the vicinity of the optical axis of the light source lamp 112, while presenting gradually weakening brightness away from the optical axis. Furthermore, brightness is not necessarily spherically symmetrical with respect to the optical axis, left to right, and up to down. More particularly, in connection with brightness of the partial light beams passing through the first and second lens arrays 120B and 130B, brightness level at the second row and fifth row is now considered as a medium brightness as shown in FIG. 14(D), and the third and fourth rows are brighter and the first and sixth rows are darker. As shown in FIG. 14(B), in this embodiment, the first, third and fifth rows are combined into a first group, and the second, and fourth and sixth rows are combined into a second group so that the first and second groups may be shifted in position in the x direction. As a result, dark lines at a substantially equal darkness level are separately formed in two positions, and are thus less visible than dark lines having different darkness levels. The grouping is not limited to the grouping by odd-even numbers, but it is important that the light quantity of the partial light beams in each group be substantially equal from group to group. For example, the number of groups may be three, rather than two. If the variation in light quantity along a vertical axis is symmetrical, this method may be applied to the second embodiment as well.

The second and third embodiments are identical in that the dark lines generated by the partial light beams in the same column are separated in two positions. The advantage of the second embodiment over the third embodiment is that the first and second lens arrays and polarization conversion device are of a simple construction.

As already described in connection with the first and second embodiments, to make the dark lines less visible, it is preferred that the dark lines arising from the partial light beams are not superimposed and that the intervals between the dark lines are spaced as wide as possible. To this end, the displacement d2B between the odd-numbered rows and the even-numbered rows in the second lens array 130B shown in FIGS. 14(B) and 14(C) is preferably set to be ¼ of the width d1A of the small lens 132B (132Ba, 132Bb) so that the dark lines generated by the odd-numbered rows are interposed in the middle of the respective intervals of the dark lines generated by the partial light beams through the even-numbered rows in this embodiment. With this arrangement, each dark line is formed in the middle of the interval between respective dark lines generated by the upper portion light beams. The preferred relationship of the displacements between the first lens array 120B, second lens array 130B and polarization conversion device 140B in the second embodiment is summarized as follows.

$$d2B=d1B/4, d3B=d2B/2, d4B=d1B/4 \quad (5)$$

where d1B represents the width of the small lens in the x direction.

Although the third embodiment has been discussed in connection with the projection-type display apparatus incorporating the polarization conversion device 140A, the present invention may be implemented in a display apparatus without the polarization conversion device 140B as in the first and second embodiments. This arrangement is equivalent to the state of the third embodiment in which the partial light beams arising from the reflecting film 145 in the polarization conversion device 140B are not present, and it is sufficient enough if the displacement d2B in the second lens array 130B shown in FIG. 14(B) is set to be ½ of the width d1B of the small lens 132B (132Ba and 132Bb) in the x direction. When the polarization conversion device 140B is not used, the relationship of the displacements in the first lens array 120B and second lens array 130B is summarized as follows.

$$d2B=d1B/2, d3B=d2B/2 \quad (6)$$

where d1B represents the width of the small lens in the x direction.

Figure 15A:
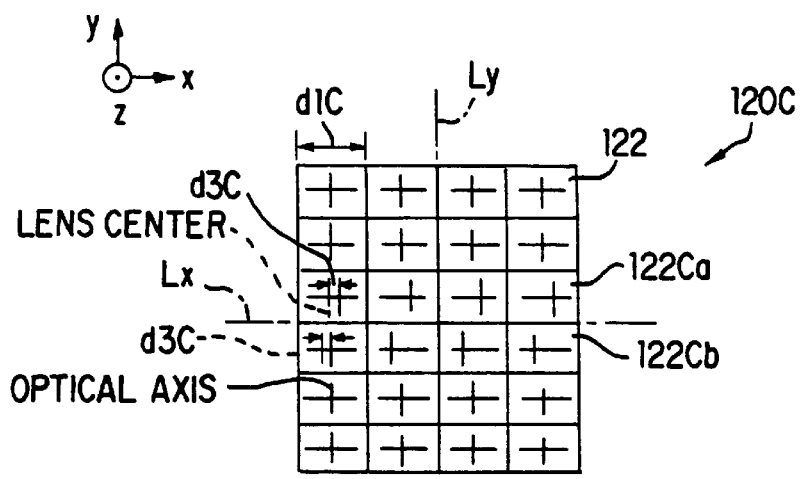
FIGS. 15(A)–15(C) are front views showing the first lens array 120C, second lens array 130C and polarization conversion device 140C viewed from the z direction according to the fourth embodiment.
Figure 15B:
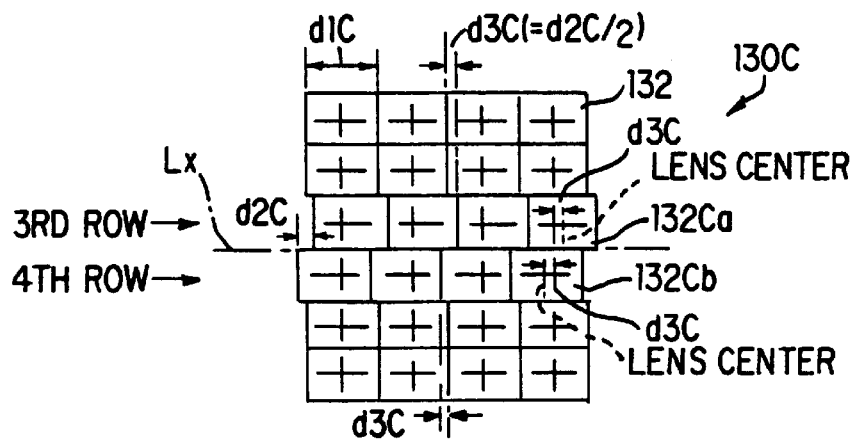
Figure 15C:
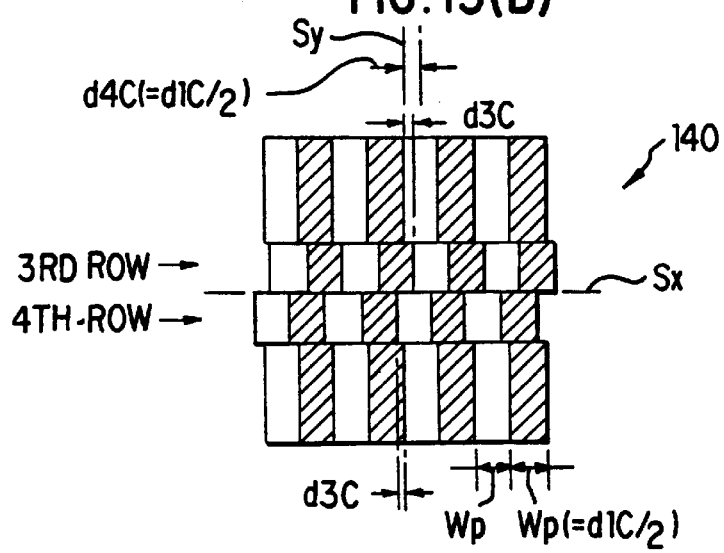
Figure 16:
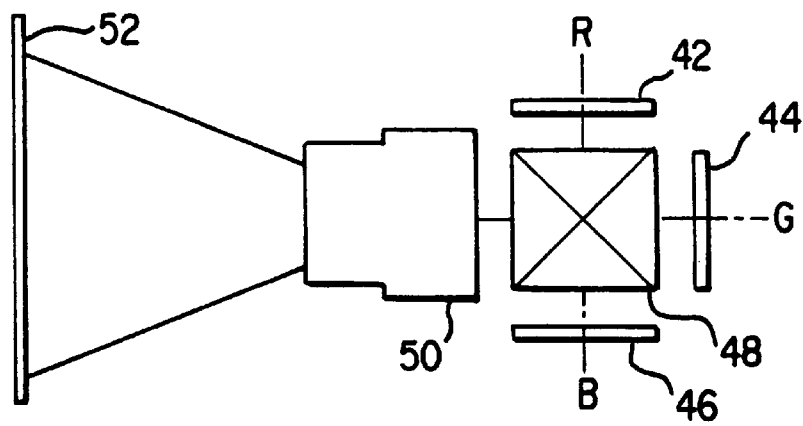
FIG. 16 is an illustration of the concept of the major portion of the projection-type display apparatus.

D. Fourth embodiment:

FIGS. 15(A)–15(C) are front views of a first lens array 120C, a second lens array 130C and a polarization conversion device 140C in a fourth embodiment, viewed from the z direction.

In the fourth embodiment, the third row and fourth row in the second lens array 130C are shifted by a displacement d3C from the center line Ly in the directions of +x and −x, respectively. The displacement d3C of the fourth row relative to the third row is equal to twice the displacement d3C with respect to the center line Ly.

The optical axis of each small lens 122Ca in the third row in the first lens array 120C is shifted by a displacement d3C from the lens center of the small lens in the direction of +x, and the optical axis of the corresponding small lens 132Ca in the second lens array 130C is shifted by a displacement d3C from its lens center in the direction of −x. As already described with reference to FIGS. 12(A) and 12(B), the lens center is aligned with the optical center between both small lenses in the x direction. The optical axis of each small lens 122Cb in the fourth row in the first lens array 120C is shifted by a displacement d3C from the lens center of the small lens in the direction of −x, and the optical axis of the corresponding small lens 132Cb in the second lens array 130C is shifted by a displacement d3C from its lens center in the direction of +x. The lens center is aligned with the optical center between both small lenses. The small lenses in the remaining rows are condenser lenses with their lens centers respectively aligned with optical axes.

The polarization conversion device 140C also includes the third row and fourth row shifted with respect to the center line Sy in the directions of −x and +x, respectively, to correspond to the displacement in the second lens array 130C. The center line Sy is shifted from the center line Ly in the direction of −x by a displacement d4C approximately equal to half the x-direction width Wp of the polarization separating film 144 or the reflecting film 145 in the polarization conversion device 140C so that the center of each small lens in the second lens array 130C is generally aligned with the center of the respective polarization separating film 144 in the x direction.

Like the second and third embodiments, the fourth embodiment relatively shifts the partial light beams transmitted through the third row and the partial light beams transmitted through the fourth row in the second lens array 120C from the partial light beams transmitted through the remaining rows in the x direction. Since the dark lines generated by the partial light beams arranged in the same column are separated into three, namely one by the partial light beams through the third row, one by the partial light beams through the fourth row and the other by the partial light beams through the remaining rows, the dark lines are made less visible. When the light source in use presents the highest brightness in the vicinity of the optical axis of the light source while presenting gradually weakening brightness away from the optical axis, the dark lines arising from the partial light beams in the vicinity of the light source optical axis are particularly noticeable. In such a case, the dark lines arising from the partial light beams in the vicinity of the light source optical axis are prevented from being superimposed. The fourth embodiment is a particularly useful embodiment in such a case.

As already described in connection with the first through third embodiments, to make the dark lines less visible, it is preferred that the dark lines arising from the partial light beams are not superimposed and that the intervals between the dark lines are spaced as wide as possible. In this embodiment, the dark lines generated by the partial light beams transmitted through the third and fourth rows in the same column are formed with displacements therebetween in the directions of ±x with respect to the dark lines generated by the remaining partial light beams. Depending on the set value of the displacement d3C, the dark lines may be superimposed on the dark lines generated by the partial light beams through the third row and fourth row in a next column. For this reason, the interval between the dark lines generated by the partial light beams by the rows except the third and fourth rows is preferably divided into three equal sub-intervals by the dark lines generated by the partial light beam in the third row and the partial light beam in the fourth row. To achieve this, the displacement d2C between the third row and the fourth row in the second lens array 130C shown in FIG. 15 is preferably set to be ⅓ of the width d1C of the small lens 132C (132Ca and 132Cb) in the x direction. With this arrangement, the intervals between the dark lines generated by the third row, fourth row and the remaining rows except the third and fourth rows are equally spaced, and the intervals between the dark lines are spaced most. The preferred relationship of the displacements between the first lens array 120C, second lens array 130C and polarization conversion device 140C in the second embodiment is summarized as follows.

$$d2C=d1C/3, \; d3C=d2C/2, \; d4C=d1C/4 \tag{7}$$

where d1C represents the width of the small lens in the x direction.

Although this embodiment has been discussed in connection with the projection-type display apparatus incorporating the polarization conversion device 140C, the present invention may be implemented in a display apparatus without the polarization conversion device 140C as in the first through third embodiments. This arrangement is equivalent to the state in which the partial light beams arising from the reflecting film 145 in the polarization conversion device 140C are not present, and it is sufficient enough if the displacement d2C in the second lens array 130C shown in FIG. 15(B) is set to be ⅔ of the width d1C of the small lens 132C (132Ca and 132Cb) in the x direction. When the polarization conversion device 140C is not used, the relationship of the displacements in the first lens array 120C and second lens array 130C is summarized as follows.

$$d2C=d1C \times (2/3), \; d3C=d2C/2 \tag{8}$$

where d1C represents the width of the small lens in the x direction.

The present invention is not limited to the above embodiments including the second through fourth embodiments, and a variety of changes and modification are possible within the scope of the present invention, and the following modifications are possible, for example.

(1) The second lens array may have rows which are shifted in different positions from row to row or which are shifted in different positions from area to area in which the rows are divided into a plurality of areas along division lines running in the direction of rows. In the second lens array, one single row only or one single area only may be shifted into a different position in the direction of rows. Although the light beam from the light source is split into a matrix of a plurality of light beams in the above embodiments, the present invention is implemented when the light beam is split into a plurality of light beams at least in substantially one row. More particularly, out of small lenses in a plurality of rows at least in the same columns in the second lens array, second small lenses in at least one row may be shifted in position by a predetermined displacement in the direction of rows from the small lenses in the other rows. In this case, it is preferred that the displaced second small lenses successfully receive the light beams exiting from the first lens array. To this end, first small lenses in the first lens array corresponding to the second small lenses may be of a decentered lens in which its geometric center is decentered from its optical center in the direction of rows. The partial light beams arranged in one column in the same direction of columns and exiting from the second lens array preferably illuminate the same position on the area of illumination regardless of the displacement of the small lenses in the direction of rows. To this end, for example, the second small lenses are constructed of a decentered lens which has its optical center shifted in the direction opposite to the direction in which the optical center is shifted from the geometric center in the first small lens so that the polarized light beams incident on the second small lenses in the second lens array travel in the same direction as the partial light beams incident on the first small lenses in the first lens array.

With this arrangement, the superimposing lens arranged downstream of the second lens array superimposes the partial light beams in one column in the same direction of columns on the same area of illumination. The angles of incidence of the partial light beams, transmitted through the first and second lens arrays, to the area of illumination are different from the angles of incidence of the partial light beams transmitted through the other small lenses. In this way, the position of the partial light beams with respect to the central axis of the cross-dichroic prism is made different from the partial light beams transmitted through the first to second small lenses and the partial light beams transmitted through the other small lenses, and the positions of the dark lines are thus separated. The dark lines attributed to the cross-dichroic prism are thus made less visible.

(2) In the above embodiments, the present invention is implemented in the transmission, projection-type display apparatus, and the present invention may be implemented in a reflection projection-type display apparatus. The "transmission projection-type display apparatus" means the type in which light modulation means, such as a liquid-crystal light valve, transmits a light beam. The "reflection projection-type display apparatus" means the type in which light modulation means transmits a light beam. The cross-dichroic prism functions as color separating means for separating the white light into three color lights of red, green and blue while functioning as color synthesizing means for synthesizing back three modulated color light beams to output them in the same direction. Even if the present invention is implemented in the reflection projection-type display apparatus, the same advantage as in the transmission projection-type display apparatus is enjoyed.

What is claimed is:

1. A projector comprising
   a light source emitting a light beam;
   a first lens array including a plurality of first lenses arranged in row that split the light beam emitted by the light source into a plurality of partial light beams;
   a second lens array including a plurality of second lenses arranged in rows respectively corresponding to the plurality of first lenses in the first lens array, each of the first and second lens arrays being divided into a plurality of groups of rows, each of the groups of rows including at least two rows of lenses and each of the groups of rows being offset from adjoining groups;
   a superimposing lens disposed at an exit side of the second lens array, for substantially superimposing the plurality of partial light beams transmitted through the plurality of lenses of the first lens array and the second lens array at an area of illumination;

a polarization conversion device comprising a polarizing beam splitter array including a plurality of sets of mutually parallel polarization splitting films and reflecting films and splitting each of a plurality of partial light beams transmitted through the plurality of second lenses of the second lens array into linearly polarized light components of two types, and a polarization conversion element that aligns polarization directions of the linearly polarized light components of the two types split by the polarizing beam splitter array, the polarization conversion device being divided into a plurality of areas corresponding to the arrangement of the groups of lenses of the first and second lens arrays;

a color light separation device that separates the light emitted from the superimposing lens into three color light beams;

three light modulation devices, each having a light entrance surface as the area of illumination that modulate the three color light beam based on an image signal;

a color synthesizing device having dichroic films of two types mutually crossed in a shape of a letter X and having a central axis corresponding to a position where the dichroic films intersect each other and arranged in a direction of columns of the lenses the color synthesizing device synthesizing the three color light beams modulated by the three light modulation devices to output resulting light beams in a same direction; and a projection device that projects the resulting light beams synthesized by the color synthesizing device to a projection surface.

2. The projector according to claim 1, one group of rows being offset from another group of rows by a displacement of about ¼ to ⅓ of the width of the lenses in a direction of the rows.

3. A projector comprising:

a light source emitting a light beam;

a first lens array including a plurality of first lenses arranged in a matrix of rows and columns that split the light beam emitted by the light source into a plurality of partial light beams, the plurality of first lenses, in at least one of the rows being decentered lenses, each having an optical center offset from a geometric center of the decentered lenses in a direction of the rows so that the first lenses in the at least one of the rows deflect the partial light beams transmitted therethrough to an optical path of the partial light beams transmitted through the plurality of first lenses in remaining rows;

a second lens array including a plurality of second lenses arranged in a matrix of rows and columns corresponding to the plurality of first lenses in the first lens array, the plurality of second lenses including optical elements in each of the rows, the optical elements in at least one row being offset by a predetermined displacement in a direction of the rows from the optical elements in remaining rows;

a superimposing lens disposed at an exit side of the second lens array, for substantially superimposing the plurality of partial light beams transmitted through the plurality of lenses of the first lens array and the second lens array at an area of illumination;

a polarization conversion device arranged between the second lens array and the superimposing lens, the polarization conversion device comprising a polarizing beam splitter array including a plurality of sets of mutually parallel polarization splitting films and reflecting films and splitting each of a plurality of partial light beams transmitted through the plurality of second lenses of the second lens array into linearly polarized light components of two types, and a polarization conversion element that aligns polarization directions of the linearly polarized light components of the two types split by the polarizing beam splitter array, the polarization conversion device being divided into a plurality of areas corresponding to the arrangement of the optical elements of the second lens array;

a color light separation device that separates the light emitted from the superimposing lens into three color light beams;

three light modulation devices, each having a light entrance surface as the area of illumination that modulate the three color light beams based on an image signal;

a color synthesizing device having dichroic films of two types mutually crossed in a shape of a letter X and having a central axis corresponding to a position where the dichroic films intersect each other and arranged in a direction of columns of the lenses, the color synthesizing device synthesizing the three color light beams modulated by the three light modulation devices to output resulting light beams in a same direction; and a projection device that projects the resulting light beams synthesized by the color synthesizing device to a projection surface.

4. The projector according to claim 3, one group of rows being offset from another group of rows by a displacement of about ¼ to ⅓ of the width of the lenses in a direction of rows.

* * * * *